US011404053B1

(12) United States Patent
Cheng et al.

(10) Patent No.: US 11,404,053 B1
(45) Date of Patent: Aug. 2, 2022

(54) SPEECH-TO-ANALYTICS FRAMEWORK WITH SUPPORT FOR LARGE N-GRAM CORPORA

(71) Applicant: SAS Institute Inc., Cary, NC (US)

(72) Inventors: Xiaozhuo Cheng, Beijing (CN); Xu Yang, Cary, NC (US); Xiaolong Li, Cary, NC (US); Biljana Belamaric Wilsey, Cary, NC (US); Haipeng Liu, Beijing (CN); Jared Peterson, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/370,441

(22) Filed: Jul. 8, 2021

Related U.S. Application Data

(63) Continuation of application No. PCT/CN2021/082572, filed on Mar. 24, 2021.

(51) Int. Cl.
*G06N 3/02* (2006.01)
*G06N 7/00* (2006.01)
(Continued)

(52) U.S. Cl.
CPC .............. *G10L 15/197* (2013.01); *G06N 3/02* (2013.01); *G06N 7/005* (2013.01); *G10L 15/04* (2013.01);
(Continued)

(58) Field of Classification Search
CPC .......... G06N 3/02; G06N 7/005; G10L 15/04; G10L 15/16; G10L 15/1815; G10L 15/197; G10L 15/22; G10L 15/30
See application file for complete search history.

(56) References Cited

U.S. PATENT DOCUMENTS 5,502,791 A * 3/1996 Nishimura ............ G10L 15/142
704/256
6,535,851 B1 3/2003 Fanty et al.
(Continued)

FOREIGN PATENT DOCUMENTS

KR 20080039009 A * 5/2008

OTHER PUBLICATIONS

Memushaj, Alket, and Tarek M. Sobh. "Using grapheme n-grams in spelling correction and augmentative typing systems." New Mathematics and Natural Computation 4.01 (2008): 87-106. (Year: 2008).*
(Continued)

*Primary Examiner* — Daniel C Washburn
*Assistant Examiner* — Oluwadamilola M Ogunbiyi
(74) *Attorney, Agent, or Firm* — KDB Firm PLLC

(57) ABSTRACT

An apparatus includes processor(s) to: generate a set of candidate n-grams based on probability distributions from an acoustic model for candidate graphemes of a next word most likely spoken following at least one preceding word spoken within speech audio; provide the set of candidate n-grams to multiple devices; provide, to each node device, an indication of which candidate n-grams are to be searched for within the n-gram corpus by each node device to enable searches for multiple candidate n-grams to be performed, independently and at least partially in parallel, across the node devices; receive, from each node device, an indication of a probability of occurrence of at least one candidate n-gram within the speech audio; based on the received probabilities of occurrence, identify the next word most likely spoken within the speech audio; and add the next word most likely spoken to a transcript of the speech audio.

30 Claims, 20 Drawing Sheets

(51) Int. Cl.
*G10L 15/04* (2013.01)
*G10L 15/16* (2006.01)
*G10L 15/18* (2013.01)
*G10L 15/197* (2013.01)
*G10L 15/22* (2006.01)
*G10L 15/30* (2013.01)

(52) U.S. Cl.
CPC .......... *G10L 15/16* (2013.01); *G10L 15/1815* (2013.01); *G10L 15/22* (2013.01); *G10L 15/30* (2013.01)

(56) References Cited

U.S. PATENT DOCUMENTS

| | | | |
|---|---|---|---|
| 7,813,928 B2* | 10/2010 | Okimoto | G10L 15/22 704/251 |
| 8,930,192 B1* | 1/2015 | Meisel | G10L 13/08 704/260 |
| 8,965,763 B1 | 2/2015 | Chelba et al. | |
| 9,009,025 B1* | 4/2015 | Porter | G10L 15/22 704/9 |
| 9,037,967 B1* | 5/2015 | Al-Jefri | G06F 40/232 715/257 |
| 9,153,231 B1 | 10/2015 | Salvador et al. | |
| 9,437,186 B1 | 9/2016 | Liu et al. | |
| 9,508,341 B1* | 11/2016 | Parlikar | G10L 15/18 |
| 10,242,669 B1 | 3/2019 | Sandler et al. | |
| 11,038,934 B1* | 6/2021 | Hansen | G06F 21/32 |
| 2006/0031069 A1* | 2/2006 | Huang | G10L 13/08 704/243 |
| 2006/0053009 A1 | 3/2006 | Jeong et al. | |
| 2006/0080099 A1 | 4/2006 | Thomas et al. | |
| 2006/0287859 A1 | 12/2006 | Hetherington et al. | |
| 2007/0112569 A1* | 5/2007 | Wang | G10L 13/08 704/260 |
| 2007/0225977 A1* | 9/2007 | Emam | G06F 40/53 704/235 |
| 2008/0091429 A1* | 4/2008 | Badt | G10L 15/12 704/255 |
| 2010/0125447 A1* | 5/2010 | Goswami | G06F 40/263 704/8 |
| 2010/0169090 A1 | 7/2010 | Cui et al. | |
| 2011/0008020 A1* | 1/2011 | Inoue | G11B 27/105 386/296 |
| 2012/0239401 A1 | 9/2012 | Arakawa | |
| 2014/0039888 A1 | 2/2014 | Taubman et al. | |
| 2015/0142888 A1* | 5/2015 | Browning | H04L 67/22 709/204 |
| 2015/0160855 A1* | 6/2015 | Bi | G06F 3/0236 715/773 |
| 2015/0243278 A1* | 8/2015 | Kibre | G10L 15/187 704/243 |
| 2015/0287405 A1 | 10/2015 | Biadsy et al. | |
| 2015/0340034 A1 | 11/2015 | Schalkwyk et al. | |
| 2016/0019887 A1 | 1/2016 | Kim et al. | |
| 2016/0104482 A1 | 4/2016 | Aleksic et al. | |
| 2016/0379632 A1 | 12/2016 | Hoffmeister et al. | |
| 2017/0053652 A1 | 2/2017 | Choi et al. | |
| 2017/0140753 A1* | 5/2017 | Jaitly | G10L 15/16 |
| 2018/0061439 A1 | 3/2018 | Diamos et al. | |
| 2018/0090134 A1 | 3/2018 | Miller et al. | |
| 2018/0121539 A1* | 5/2018 | Ciulla | G06F 16/3344 |
| 2018/0166103 A1 | 6/2018 | Wang et al. | |
| 2018/0174576 A1 | 6/2018 | Soltau et al. | |
| 2018/0211652 A1 | 7/2018 | Mun et al. | |
| 2018/0254039 A1 | 9/2018 | Qian et al. | |
| 2018/0322865 A1 | 11/2018 | Huang et al. | |
| 2019/0013015 A1 | 1/2019 | Menendez-Pidal et al. | |
| 2019/0057683 A1* | 2/2019 | Sak | G10L 15/22 |
| 2019/0139540 A1 | 5/2019 | Kanda | |
| 2019/0189115 A1 | 6/2019 | Hori et al. | |
| 2019/0267023 A1 | 8/2019 | Das et al. | |
| 2019/0295533 A1* | 9/2019 | Wang | G10L 15/1815 |
| 2019/0304452 A1 | 10/2019 | Kawano et al. | |
| 2019/0341032 A1* | 11/2019 | Hammons | G06F 1/3231 |
| 2019/0341033 A1* | 11/2019 | Hammons | G10L 15/22 |
| 2020/0066271 A1* | 2/2020 | Li | G10L 15/22 |
| 2020/0118545 A1* | 4/2020 | Wang | G10L 15/197 |
| 2020/0175993 A1 | 6/2020 | Cho et al. | |
| 2020/0410985 A1 | 12/2020 | Chen et al. | |
| 2021/0082410 A1* | 3/2021 | Teserra | G06F 40/30 |

OTHER PUBLICATIONS

Yoshimura et al., ""End-to-End Automatic Speech RecognitionIntegrated with CTC-Based Voice Activity Detection"" arXiv:2002.00551v2 [eess.AS] Feb. 14, 2020.

Das, Amit, et al. "Advancing connectionist temporal classification with attention modeling." 2018 IEEE International Conference onAcoustics, Speech and Signal Processing (ICASSP). IEEE, 2018. (Year: 2018).

Graves, Alex, et al. "Connectionist temporal classification: labeling unsegmented sequence data with recurrent neural networks." Proceedings of the 23rd international conference on Machine learning. 2006. (Year: 2006).

Xu, Chenglin, Lei Xie, and Xiong Xiao. "A bidirectional LSTM approach with word embeddings for sentence boundary detection." Journal of Signal Processing Systems 90. 7 (2018): 1063-1075. (Year: 2018).

Bahdanau, Dzmitry et al., "End-to-end altention-based large vocabulary speech recognition" IEE International Conference on Ccoustics, Speech and Signal Processing (ICASSP). IEEE, 2016.

Scheidl, Harald, et al., "Word beam search: A Connectionist Temporal classification decoding algorithm." 2018 16th International Conference on Frontiers in Handwriting Recognition (CFHR). IEEE, 2018.

* cited by examiner

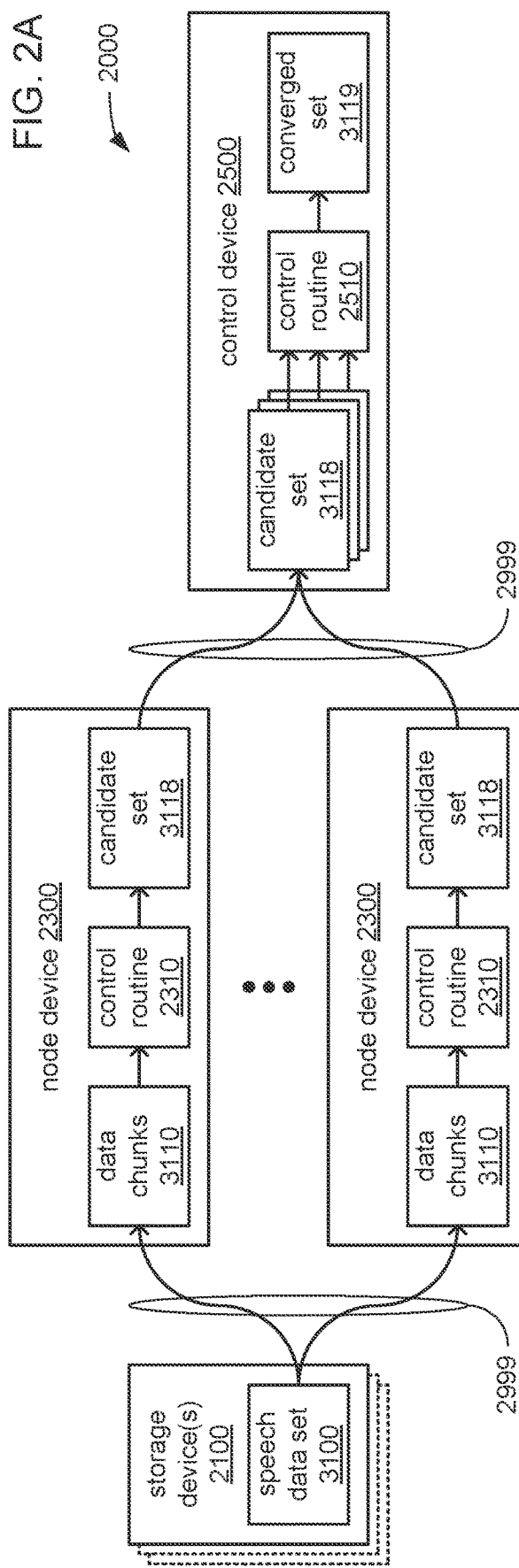

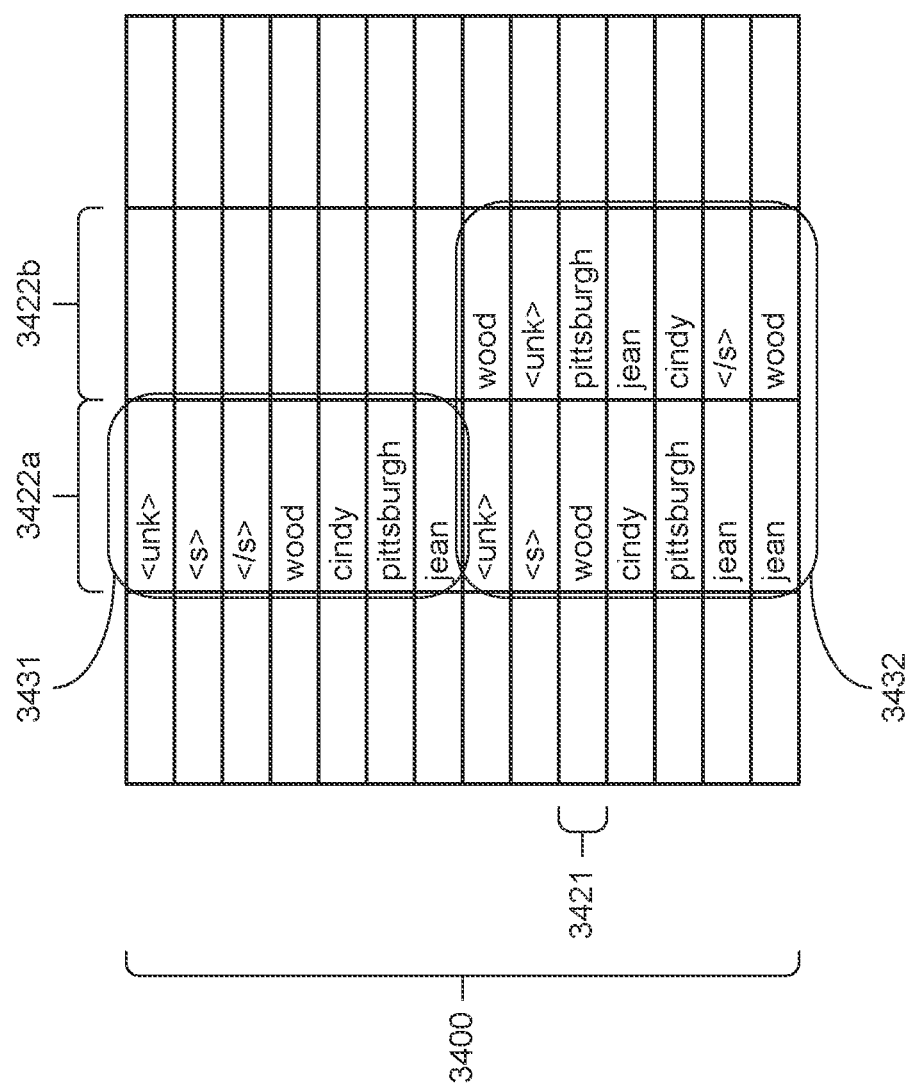

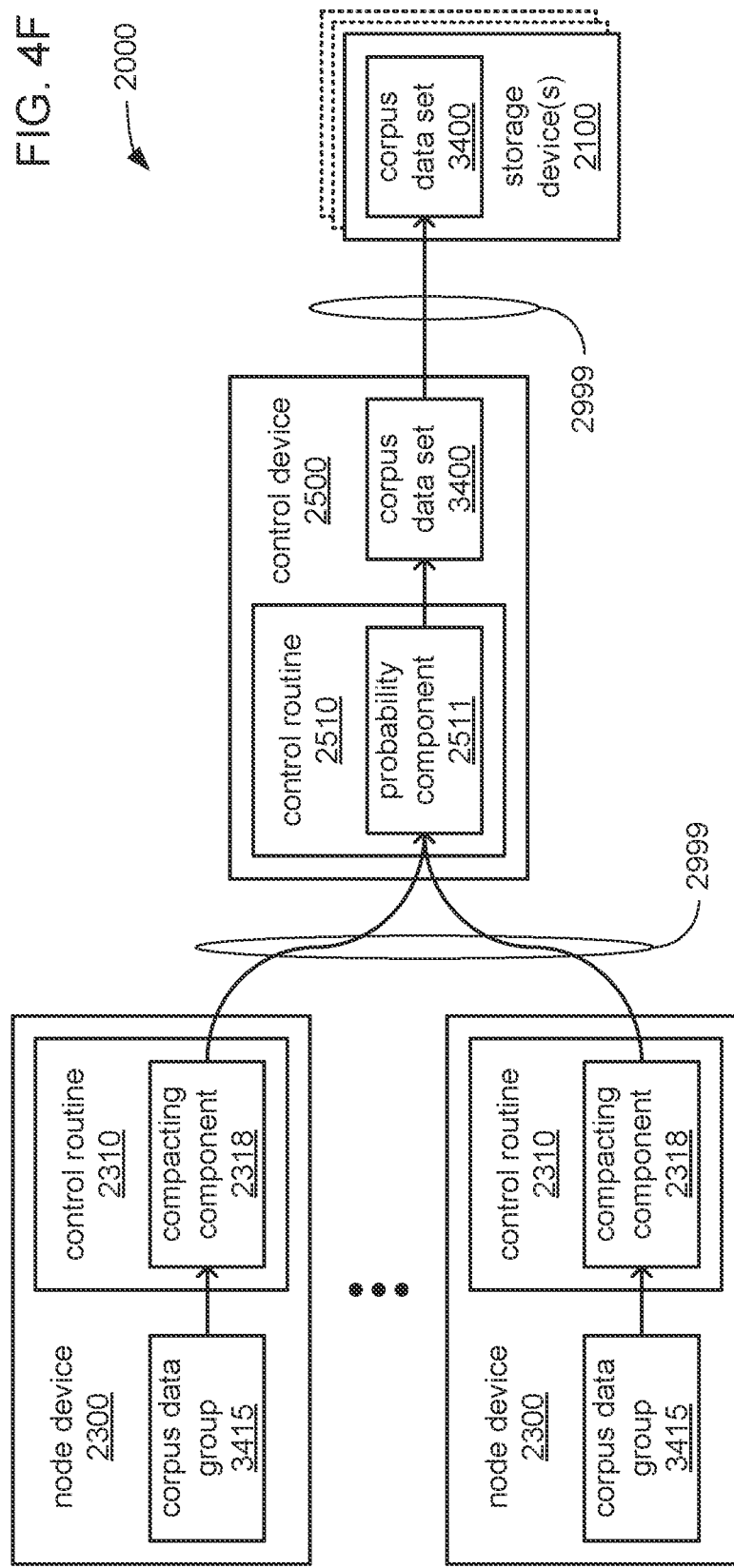

FIG. 4G

| 3431 | 3422a | 3422b | |
|---|---|---|---|
| -1 | <unk> | | -0.2553 |
| -98.9366 | <s> | | -0.3064 |
| -1 | </s> | | 0 |
| -0.699 | wood | | |
| -0.699 | cindy | | -0.2553 |
| -0.699 | pittsburgh | | -0.2553 |
| -0.699 | jean | | -0.2553 |
| -0.2553 | <unk> | wood | -0.1973 |
| -0.2553 | <s> | <unk> | |
| -0.2553 | wood | pittsburgh | |
| -0.2553 | cindy | jean | |
| -0.2553 | pittsburgh | cindy | |
| -0.5563 | jean | </s> | |
| -0.5563 | jean | wood | |

3421, 3432, 3400

SPEECH-TO-ANALYTICS FRAMEWORK WITH SUPPORT FOR LARGE N-GRAM CORPORA

CROSS-REFERENCE TO RELATED APPLICATIONS

This application is a continuation of, and claims the benefit of priority under 35 U.S.C. § 120 to, International Application No. PCT/CN2021/082572 filed Mar. 24, 2021, and entitled "Speech-to-Analytics Framework with Support for Large N-Gram Corpora", which is incorporated herein by reference in its entirety for all purposes.

To be more precise, International Application No. PCT/CN2021/082572 designates the United States such that it is eligible to be treated as if it were "a national application for patent regularly filed in the Patent and Trademark Office" with its Mar. 24, 2021 international filing date being treated as the filing date on which such regular filing is deemed to have occurred, as per at least 35 U.S.C. § 363. Therefore, and as per at least 35 U.S.C. § 120 and § 365(c), this application claims domestic priority to International Application No. PCT/CN2021/082572 as a "bypass" application (more specifically, a "bypass" continuation application).

TECHNICAL FIELD

Various embodiments are generally directed to techniques for improving the accuracy of speech-to-text conversion and efficacy of associated text analytics.

BACKGROUND

It has become commonplace to perform various content analyses of the text of captured speech audio. Such analyses may be performed to automate the retrieval of various insights from verbal conversations, recorded verbal messages, verbal storytelling, and/or verbally delivered presentations. Such insights may include topic(s) of conversations and/or verbal presentations, relative degrees of focus of each topic among multiple topics, relative levels of participation among multiple speakers, type and/or strength of sentiments concerning topics, effectiveness of verbal communications, etc.

Such automated retrieval of insights may be performed as part of indexing and/or memorializing the contents of recorded voice messages, phone conversations and/or radio communications. Alternatively or additionally, such automated retrieval of insights may be performed as part of an evaluation of the quality of service provided in telephone service calls, the efficiency or effectiveness of communication in emergency services calls, and/or the effectiveness of an effort to disseminate information to the public in press interviews or in other verbal presentations.

Regardless of the purpose for such analyses, longstanding challenges have been, and continue to be, improving the accuracy of the prerequisite speech-to-text conversion and of the analyses, themselves. As will be familiar to those skilled in the art, in the area of machine-based speech-to-text conversion, there are numerous challenges to accuracy, including and not limited to, quality issues with the devices used to capture speech audio, high environmental noise levels, differences in regional accents and/or dialects, differences in idiomatic expressions, and/or per-person differences in pronunciation, speed of speaking, speaking volume, speech impediments, etc. These accuracy issues with speech-to-text conversion result in the provision of error-laden text as the input to text analyses, which in turn, results in the generation of false and misleading insights.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one processor and a storage to store instructions that, when executed by the at least one processor, cause the at least one processor to perform operations including receive, from a requesting device via a network, a request to perform operations including speech-to-text conversion of a specified speech data set representing speech audio. In response to the request, the at least one processor is also caused to perform speech-to-text processing operations including: select, based on a level of availability of at least one resource of each node device of a plurality of node devices, a first subset of the plurality of node devices to perform searches for n-grams within an n-gram corpus provided to each node device of the first subset; generate a set of candidate n-grams based on probability distributions generated by an acoustic model for candidate graphemes of a next word most likely spoken following at least one preceding word spoken within the speech audio; provide the set of candidate n-grams to each node device of the first subset; provide, to each node device of the first subset, an indication of which candidate n-grams are to be searched for within the n-gram corpus by a processor of the node device to enable searches for multiple candidate n-grams to be performed, independently and at least partially in parallel, across the first subset; receive, from each node device of the first subset, an indication of a probability of occurrence of at least one candidate n-gram within the speech audio; based on the received probabilities of occurrence for each candidate n-gram of the set of candidate n-grams, identify the next word most likely spoken within the speech audio; and add the next word most likely spoken to a transcript of the speech audio.

A computer-program product tangibly embodied in a non-transitory machine-readable storage medium includes instructions operable to cause at least one processor to perform operations including receive, from a requesting device via a network, a request to perform operations including speech-to-text conversion of a specified speech data set representing speech audio. In response to the request, the at least one processor is also caused to perform speech-to-text processing operations including: select, based on a level of availability of at least one resource of each node device of a plurality of node devices, a first subset of the plurality of node devices to perform searches for n-grams within an n-gram corpus provided to each node device of the first subset; generate a set of candidate n-grams based on probability distributions generated by an acoustic model for candidate graphemes of a next word most likely spoken following at least one preceding word spoken within the speech audio; provide the set of candidate n-grams to each node device of the first subset; provide, to each node device of the first subset, an indication of which candidate n-grams are to be searched for within the n-gram corpus by a processor of the node device to enable searches for multiple candidate n-grams to be performed, independently and at least partially in parallel, across the first subset; receive, from each node device of the first subset, an indication of a probability of occurrence of at least one candidate n-gram within the speech audio; based on the received probabilities of occurrence for each candidate n-gram of the set of candidate n-grams, identify the next word most likely spoken within the speech audio; and add the next word most likely spoken to a transcript of the speech audio.

A computer-implemented method includes receiving, at a control device of a distributed processing system, and from a requesting device via a network, a request to perform operations comprising speech-to-text conversion of a specified speech data set representing speech audio. The computer-implemented method also includes, in response to the request, performing speech-to-text processing operations including: selecting, by at least one processor of the distributed processing system, and based on a level of availability of at least one resource of each node device of a plurality of node devices, a first subset of the plurality of node devices to perform searches for n-grams within an n-gram corpus provided to each node device of the first subset; generating, by the at least one processor, a set of candidate n-grams based on probability distributions generated by an acoustic model for candidate graphemes of a next word most likely spoken following at least one preceding word spoken within the speech audio; providing the set of candidate n-grams to each node device of the first subset; providing, to each node device of the first subset, an indication of which candidate n-grams are to be searched for within the n-gram corpus by a processor of the node device to enable searches for multiple candidate n-grams to be performed, independently and at least partially in parallel, across the first subset; receiving, at the control device, and from each node device of the first subset, an indication of a probability of occurrence of at least one candidate n-gram within the speech audio; based on the received probabilities of occurrence for each candidate n-gram of the set of candidate n-grams, identifying, by the at least on processor, the next word most likely spoken within the speech audio; and adding the next word most likely spoken to a transcript of the speech audio.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 2A, 2B, 2C, 2D and 2E, together, illustrate aspects of a framework defining a set of processing operations to be performed to derive insights from the contents of recorded and stored speech audio.

FIGS. 4A, 4B, 4C, 4D, 4E, 4F and 4G, together, illustrate aspects of the generation and/or augmentation of a larger than commonplace n-gram corpus of the type that may be used as described in the processing operations of FIGS. 3A-F.

DETAILED DESCRIPTION

Figure 1A:
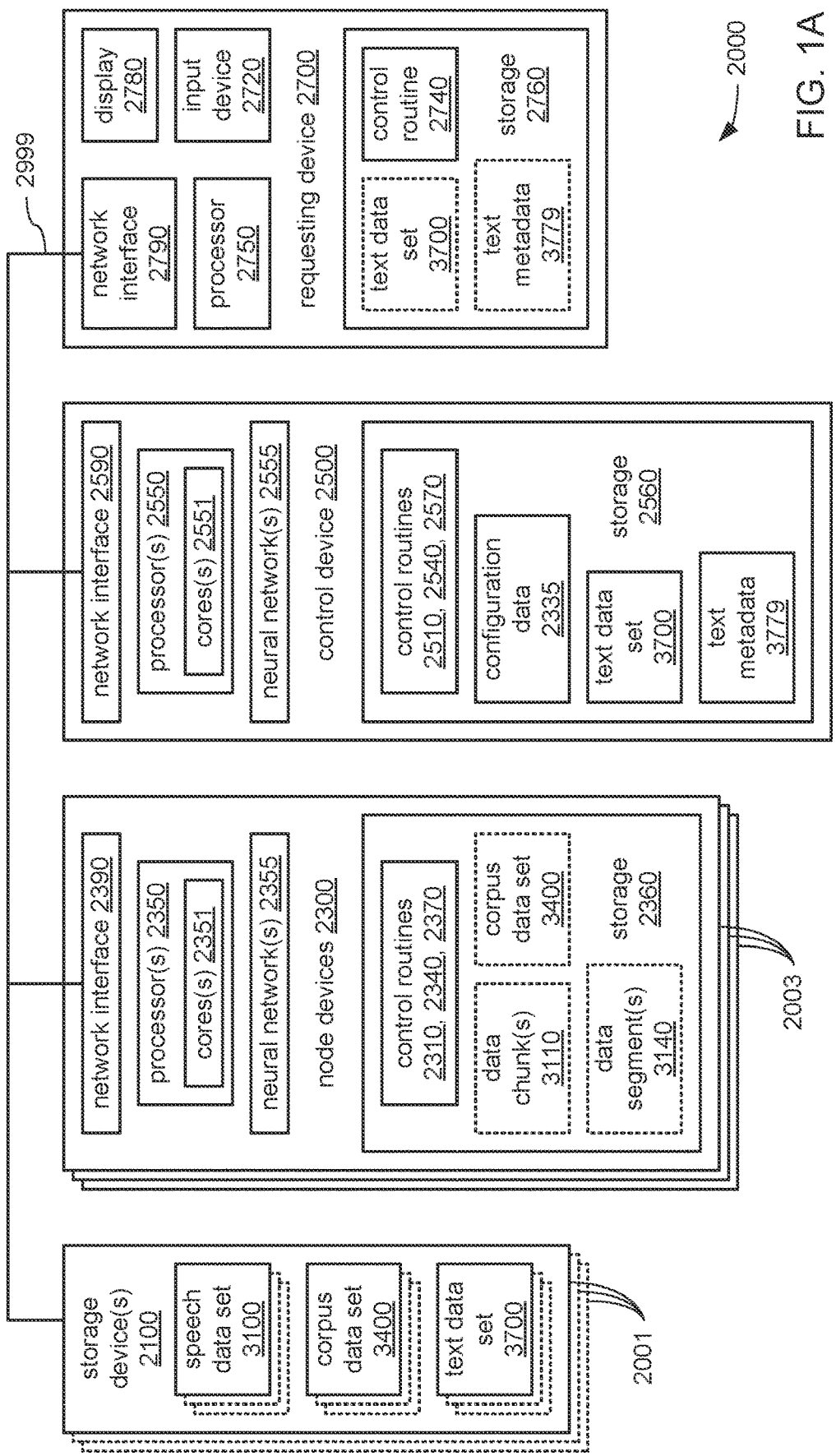
FIGS. 1A and 1B, together, illustrate aspects of an example embodiment of a distributed processing system.

Various embodiments are generally directed to techniques for improving the accuracy of speech-to-text conversion and efficacy of associated text analytics. More specifically, a framework for the derivation of insights into the content of pieces of speech audio may incorporate a chain of pre-processing, processing and post-processing operations that are selected to provide improved insights. During pre-processing, as an alternative to the commonplace approach of simply dividing speech audio into equal-length segments without regard to its content, a combination of techniques is used to identify likely sentence pauses to enable the division of the speech audio into speech segments at likely sentence pauses so that the resulting speech segments are more likely to contain the pronunciations of complete sentences. During speech-to-text processing, the derived probability distributions associated with the identification of more likely graphemes (e.g., text characters representing phonemes) and/or pauses by an acoustic model, as well as the probability distributions associated with the identification of more likely n-grams by a language model, are used in identifying the sentences spoken in the speech audio to generate a corresponding transcript. During text analytics post-processing, the corresponding transcript is analyzed to select words that are pertinent to identifying topics or sentiments about topics, and/or analyzed along with other transcripts to identify relationships between different pieces of speech audio.

More specifically, during pre-processing of the speech audio in preparation for speech-to-text conversion, the speech audio may be initially divided into equal-length speech chunks that are then provided as inputs to the performances of each of multiple segmentation techniques. The multiple segmentation techniques may be performed, at least partially in parallel, across multiple threads of execution within a single device, and/or across multiple node devices. In performing each segmentation technique, each speech chunk may be analyzed to identify each occurrence therein of what is deemed likely to be a pause between two sentences. For each segmentation technique, a separate corresponding data structure may be generated that includes an indication of when each such likely sentence pause occurred across all of the chunks of the speech audio, thereby defining a candidate set of likely sentence pauses identified by that segmentation technique throughout the length of the speech audio. Following the completion of the performances of all of the segmentation techniques, the resulting multiple candidate sets of likely sentence pauses may then be combined in any of a variety of ways to generate a single converged set of likely sentence pauses.

With the converged set of likely sentence pauses having been generated, the speech audio may then be divided, again, to form speech segments, where each such division between two segments occurs at the midpoint of one of the likely sentence pauses indicated in the converged set of likely sentence pauses. Thus, unlike the earlier chunks of the speech audio, each of the speech segments is more likely to contain the pronunciation of an entire spoken sentence, thereby decreasing the likelihood that the pronunciations of words may be split across segments, and increasing the likelihood that the entire context of each word will be present within a single segment. In this way, each speech segment is more likely to contain a more complete set of the acoustic information needed to identify graphemes, phonemes, text characters, words, phrases, sentences etc. in later speech-to-text processing operations, thereby enabling greater accuracy in doing so.

The speech segments may then be provided as input to speech-to-text processing operations. More specifically, each speech segment may be provided as input to a feature detector, in which the speech audio within each speech segment is searched for any instances of a pre-selected set of particular acoustic features. It may be that multiple instances of the feature detector are executed, at least partially in parallel, across multiple threads of execution within a single device, and/or across multiple node devices. Each speech segment may be divided into multiple speech frames that are each of an equal temporal length, and each speech frame of a speech segment may be provided, one at a time, as input to a feature detector. As each instance of an acoustic feature is identified within a speech frame, an indication of the type of acoustic feature identified and when it occurs may be stored within the feature vector that correspond to the speech frame.

The feature vectors for each speech segment may then be provided as input to an acoustic model. The acoustic model may be implemented using any of a variety of technologies, including and not limited to, a neural network, a hidden Markov model, or a finite state machine. It may be that multiple instances of the acoustic model are instantiated and used, at least partially in parallel, across multiple threads of execution within a single device, and/or across multiple node devices. Based on the acoustic features that are identified by each feature vector as present within its corresponding speech frame, the acoustic model may generate probability distributions of the grapheme(s) that were spoken within each speech frame, and/or of the pauses that occurred within each speech frame.

Such probability distributions may then be grouped in temporal order to form sets of probability distributions that correspond to the speech segments, and each such set may then be provided as input to a decoder that is based on an n-gram language model. Using such a set of probability distributions, and using the contextual information inherently provided by their temporal ordering, the decoder may identify the most likely combinations of words spoken to form sentences (or at least phrases) within the corresponding speech segment. In this way, the decoder may derive a transcript of what was spoken in the speech audio, and such a transcript may be stored in a manner that is associated with the speech audio for future reference.

The transcript of the entire speech audio may be provided as a single transcript to one or more text analyzers to derive, based on such factors as the frequency with which each word was spoken, such insights as topic(s) spoken about, relative importance of topics, sentiments expressed concerning each topic, etc. It may be that each such stored transcript may be accompanied in storage with metadata indicative of such insights. Alternatively or additionally, it may be that such insights are used to identify other transcript(s) generated from other pieces of speech audio that are deemed to be related.

In embodiments in which a distributed processing system is used that includes multiple node devices, various processing operations within the framework may be performed in a manner that is distributed across those multiple node devices to improve the efficiency with which those operations are able to be performed. As will be explained in greater detail, such improvements in efficiency may also enable improvements in the handling of data such that greater use may be made of contextual information to provide improved results. By way of example, each of the different segmentation techniques may be performed within a separate one of the node devices, at least partially in parallel, such that a different one of the corresponding candidate set of likely sentence pauses may be independently derived within each such node device.

Also by way of example, multiple instances of the feature detector may be executed across the multiple node devices, and the speech segments may be distributed thereamong to enable speech detection to be performed with multiple ones of the speech segments at least partially in parallel. Further, along with the multiple instances of the feature detector, multiple instances of the acoustic model may be instantiated across the multiple node devices, thereby enabling the feature vectors derived from a speech segment by an instance of the feature detector within a node device to be directly provided to the corresponding instance of the acoustic model within the node device to enable the derivation of the set of probability distributions that correspond to that speech segment.

Also by way of example, multiple copies of the n-gram corpus may be distributed among the multiple node devices to enable each beam search across multiple n-grams for each next word in a sentence to be performed in a distributed manner without need of communication among the node devices.

Regarding the use of a language model as part of the speech-to-text processing operations, as will be readily recognized by those skilled in the art, when using a language model based on a corpus of n-grams, it is generally accepted that a larger n-gram corpus is capable of achieving higher accuracies in speech-to-text operations than a smaller one. However, as will also be familiar to those skilled in the art, each increase of one word in the quantity of words that may be included in each n-gram can result in an exponential increase in the size of the n-gram corpus. As a result, it has become commonplace to limit the quantity of words that may be included in each n-gram to 4, 5 or 6 words to avoid so overtaxing available processing and/or storage resources of typical computing devices as to become impractical for use. To overcome such limitations, the processing and storage resources of multiple node devices may be employed in particular ways that make more efficient use of distributed processing to make the use of a larger n-gram corpus more practical.

More specifically, in preparation for performing beam searches of a relatively large n-gram corpus of an n-gram language model, complete copies of such a relatively large n-gram corpus may be distributed among the multiple node devices such that each is caused to locally store the complete n-gram corpus. Proceeding in temporal order through probability distributions of graphemes that may have been pronounced throughout speech segment, the control device may derive candidate sets of n-grams to be searched for within the n-gram corpus to retrieve their corresponding probabilities. As each such n-gram candidate set is derived, the control device may provide it to all of the node devices 2300 to which the n-gram corpus has been provided to enable beam searches for each of the different candidate n-grams to be searched for, at least partially in parallel.

As part of causing different ones of the n-grams to be searched for by different ones of the node devices, a modulo calculation may be used based on identifiers assigned to each of the node devices to enable each node device to independently determine which one(s) of the n-grams within the n-gram candidate set will be searched for therein. Alternatively, the n-gram searches may be distributed among multiple execution threads of processor(s) within a single device (e.g., the control device or a single node device). As each of the node devices completes the beam search(es) for its corresponding one(s) of the candidate n-grams, indications of the relative probabilities of occurrence for each n-gram may be provided to the control device to enable the control device to identify the next word that was most likely spoken in the speech segment, and accordingly, to identify the next word to be added to the transcript of what was spoken in the speech audio. Upon completion of the transcript, the transcript may be stored by the control device within the one or more storage devices as a text data set that may be subsequently retrieved and analyzed to derive various insights therefrom, as previously discussed.

In a further effort to make the use of a relatively large n-gram corpus more practical, the corpus data sets may be generated to employ a two-dimensional (2D) array data structure, instead of the more conventional ASCII text file data structure of the widely known and used "ARPA" text format originally introduced by Doug B. Paul of the Massachusetts Institute of Technology. Avoiding the use of such a relatively unstructured text format obviates the need to use text parsing routines that can greatly decrease the speed of access to individual n-grams, and/or individual words within individual n-grams. In this way, the speed with which the n-gram corpus is able to be generated, put through deduplication, and used in beam searches may be greatly increased.

Still further, in deriving probabilities for the occurrence of each n-gram, of novel technique may be used for deriving a backoff value that is relatively simple to perform, and that is better suited to the larger n-gram corpuses that may be made practical to use by way of the various approaches described herein.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

Figure 1B:
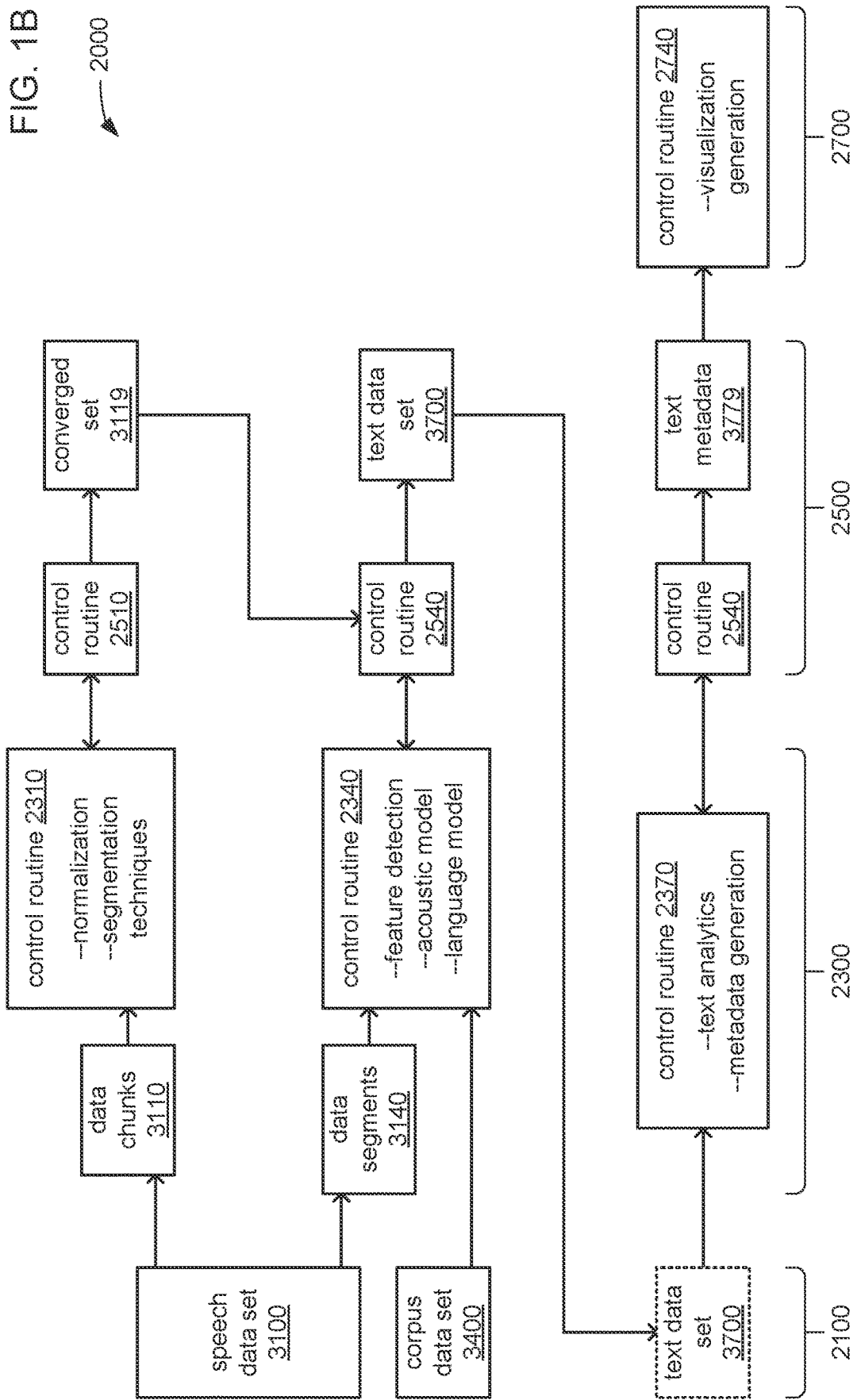

FIGS. 1A and 1B, together, illustrate aspects of an example embodiment of a distributed processing system 2000. FIG. 1A is a block diagram of components of the distributed processing system 2000, including one or more storage devices 2100 that may form a storage grid 2001, one or more node devices 2300 that may form a node device grid 2003, at least one control device 2500, and/or at least one requesting device 2700 coupled by a network 2999. FIG. 1B is a block diagram of an implementation of a framework for the derivation of insights into the contents of speech audio stored as a speech data set 3100.

The storage device(s) 2100 may store one or more speech data sets 3100 in which speech audio may be stored in any of a variety of digital audio storage formats. Where there are multiple storage devices 2100, at least a subset of the one or more speech data sets 3100 may be stored in a distributed manner in which different portions thereof are stored within different ones of the storage devices 2100. Each of the one or more speech data sets 3100 may be so stored within or retrieved from the storage device(s) 2100 by the one or more node devices 2300 under the control of the control device 2500. More specifically, in support of a distributed performance of at least some of the pre-processing operations and/or processing operations associated with preparations for, and/or the performance of, speech-to-text conversion across multiple node devices 2300, a speech data set 3100 may be divided into data chunks 3110 that each represent a chunk of the speech audio of the speech data set 3100, and/or may be divided into data segments 3140 that each represent a speech segment of that speech audio. Those data chunks 3110 and/or data segments 3140 may then be distributed among, and/or otherwise provided to, multiple ones of the node devices 2300 from different ones of the storage devices 2100.

The storage device(s) 2100 may also store one or more corpus data sets 3400 that each represent a language model implemented as a corpus of a particular language, and/or one or more text data sets 3700 that each represent a transcript of speech audio that may be stored as a speech data set 3100. As with the one or more speech data sets 3100, where there are multiple storage devices 2100, at least a subset of the one or more corpus data sets 3400, and/or at least a subset of the one or more text data sets 3700, may be stored in a distributed manner in which different portions thereof are stored within different ones of the storage devices 2100. In support of distributed speech-to-text processing operations, and/or in support of distributed text analytics post-processing operations, multiple copies of the entirety of a corpus data set 3400 may be provided to each of multiple ones of the node devices 2300.

In support of such operations, the devices 2100, 2300, 2500 and/or 2700 may exchange such portions of a speech data set 3100, may exchange copies of a corpus data set

3400, and/or may exchange other information concerning speech-to-text conversion and/or concerning text analyses through the network 2999. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

Each speech data set 3100 may be any of a variety of types of digital data representation of any of a variety of types of speech audio. Such representations of speech audio may include a series of amplitude values of one or more audio channels of any of a variety of bit widths (e.g., 8-bit, 12-bit, 16-bit, 20-bit or 24-bit), captured at any of a variety of sampling rates (e.g., 41.1 kHz, 48 kHz, 88.2 kHz or 96 kHz), and stored in any of a variety of widely used compressed or uncompressed audio data formats (e.g., MP3 (Motion Picture Experts Group layer 3), WAV (Waveform Audio), PCM (Pulse-Code Modulation), FLAC (Free Lossless Audio Codec), Dolby Digital or TrueHD of Dolby Laboratories of San Francisco, Calif., USA, or THX Ultra2 or Select2 of THX Ltd. of San Francisco, Calif., USA). In some embodiments, the speech data set 3100 may include other data beyond speech audio, such as corresponding video, corresponding still images (e.g., a corresponding slide show of still images), alternate corresponding speech audio in a different language, etc. In some of such embodiments, the speech data set 3100 may be any of a variety of types of "container" format or other data format that supports the provision of a multimedia or other combined audio and video presentation (e.g., MP4 of the International Organization for Standardization of Geneva, Switzerland).

The speech audio that is so represented within the speech data set 3100 may include any of a variety of types of speech, including and not limited to, telephone and/or radio conversations (e.g., telephone service calls, or air traffic control communications), telephone messages or other forms of voice mail, audio from in-person and/or remote conferences, lecture speech, podcasts, audio tracks from entertainment programs that include speech audio (e.g., audio from movies or from musical performances), verbal narrations of stories and/or of events in progress (e.g., narrations of sports events or other news events), and/or verbal commands to local electronic devices and/or to servers providing online services, etc.

At least a subset of the speech data sets 3100 stored by the one or more storage devices 2100 may each represent a stored recording of speech audio that was fully captured at an earlier time. Thus, such speech data set(s) 3100 may represent speech audio that may have been recorded either relatively recently (e.g., within recent minutes or hours), or long ago (e.g., weeks, months or years earlier). Alternatively or additionally, at least another subset of the speech data sets 3100 may each represent just a stored portion of speech audio that is still in the process of being captured. Thus, such speech data set(s) 3100 may serve, at least temporarily, as buffer(s) of portions of ongoing speech audio that have already been captured, with more portions thereof still in the process of being captured.

In some embodiments, multiple ones of the storage devices 2100 may be operated together (e.g., as a network-attached drive array, etc.) primarily for the purpose of persistently storing data, such as the one or more speech data sets 3100. In such embodiments, the multiple storage devices 2100 may be capable of exchanging the entirety of a relatively large speech data set 3100 with multiple node devices 2300 in a set of data transfers of portions thereof (e.g., data chunks 3110 thereof, or data segments 3140 thereof) performed at least partially in parallel through the network 2999, and such transfers may be coordinated by the control device 2500. In some embodiments, processor(s) of the one or more storage devices 2100 may each independently implement a local file system by which at least relatively small speech data sets 3100 may each be stored entirely within a single one of the storage devices 2100. Alternatively or additionally, multiple ones of the storage devices 2100 may cooperate through the network 2999 to implement a distributed file system to store larger speech data sets 3100 as multiple portions in a distributed manner across multiple ones of the storage devices 2100. As still another alternative, it may be that one or more of the storage devices 2100 store a combination of whole speech data sets 3100 that are of relatively small data size such that they are able to be stored entirely within a single storage device 2100, and a portion of at least one speech data set 3100 that is too large in data size to be able to be stored entirely within any single one of the storage devices 2100.

In various embodiments, each of the multiple node devices 2300 may incorporate one or more processors 2350, one or more neural networks 2355, a storage 2360, and/or a network interface 2390 to couple each of the node devices 2300 to the network 2999. The processor(s) 2350 may incorporate multiple processing cores 2351 and/or other features to support the execution of multiple executable routines and/or multiple instances of executable routine(s) across multiple execution threads. The storage 2360 may store control routines 2310, 2340 and/or 2370; one or more data chunks 3110; one or more data segments 3140; and/or a corpus data set 3400.

Each of the control routines 2310, 2340 and 2370 may incorporate a sequence of instructions operative on the processor(s) 2350 to implement logic to perform various functions. Referring briefly to FIG. 1B in addition to FIG. 1A, in executing the control routine 2310, the processor(s) 2350 of each of the node devices 2300 may be caused to perform various pre-processing operations, such as normalization of the digital audio storage format in which the chunk of speech audio within each data chunk 3110 is stored, and/or determining the manner in which a speech data set 3100 is to be divided into data segments 3140 thereof as input to speech-to-text processing operations. In executing the control routine 2340, the processor(s) 2350 of each of the node devices 2300 may be caused to perform various speech-to-text processing operations, such as feature detection to identify acoustic features within the speech segment of each data segment 3140, use multiple instances of an acoustic model to identify likely graphemes, and/or use multiple instances of an n-gram language model (stored as a corpus data set 3400) to assist in identifying likely words to generate a transcript of the speech audio of the speech data set 3100, which may then be stored within the one or more storage devices 2100 as a corresponding text data set 3700. In executing the control routine 2370, the processor(s) 2350 of each of the node devices 2300 may be caused to perform various post-processing operations, such as text analytics to derive various insights concerning the contents of speech audio stored as a speech data set 3100, and/or the generation of various visualizations for presenting such insights. Where such visualizations are generated by the node devices 2300 (and/or by the control device 2500), such visualizations may be stored as part of (or in a manner that accompanies) the text metadata 3779. However, where such visualizations are to be subsequently generated by the requesting device 2700, such generation of such visualizations may be based on the text metadata 3779.

Returning to FIG. 1A, in various embodiments, the control device 2500 may incorporate one or more processors 2550, one or more neural networks 2555, a storage 2560, and/or a network interface 2590 to couple the control device 2500 to the network 2999. The processor(s) 2550 may incorporate multiple processing cores 2551 and/or other features to support the execution of multiple executable routines and/or multiple instances of executable routine(s) across multiple execution threads. The storage 2560 may store control routines 2510, 2540 and/or 2570; configuration data 2335; a text data set 3700 and/or text metadata 3779.

Each of the control routines 2510, 2540 and 2570 may incorporate a sequence of instructions operative on the processor(s) 2550 to implement logic to perform various functions. Again, referring briefly to FIG. 1B in addition to FIG. 1A, in executing the control routine 2510, the processor(s) 2550 of the control device 2500 may be caused to operate the network interface 2590 to coordinate, via the network 2999, the pre-processing operations performed, at least partially in parallel, by processors 2350 of multiple ones of the node devices 2300 as a result of executing corresponding instances of the control routine 2310. More specifically, the processors 2550 may be caused to coordinate the performances of multiple segmentation techniques across multiple ones of the node devices 2300. Alternatively or additionally, as candidate sets of likely sentence pauses are derived from the performance of each segmentation technique, it may be that processor(s) 2550 of the control device 2500 are caused by the control routine 2510 to use the candidate sets received from multiple node devices 2300 to derive a converged set 3119 of likely sentence pauses.

In executing the control routine 2540, the processor(s) 2550 of the control device 2500 may be caused to operate the network interface 2590 to coordinate, via the network 2999, the processing operations performed, at least partially in parallel, by processors 2350 of multiple ones of the node device 2300 as a result of executing corresponding instances of the control routine 2340. More specifically, the processors 2550 may be caused to coordinate the generation of data segments 3140 among the node devices 2300 based on the indications of likely sentence pauses within the converged set 3119 of likely sentence pauses that were derived earlier during pre-processing. The processors 2550 may also be caused to coordinate the detection of acoustic features within the speech segment of each of the data segments 3140, and/or to coordinate the use of an acoustic model to identify likely graphemes across multiple ones of the node devices 2300. Alternatively or additionally, as sets of probability distributions of likely graphemes are derived from such use of acoustic models, it may be that the processor(s) 2550 of the control device 2500 are caused by the control routine 2540 to use the sets of probability distributions received from multiple node devices 2300 as inputs to derive beam searches of the multiple instances of an n-gram language model across multiple node devices 2300 to generate the transcript of the speech audio of the speech data set 3100.

In executing the control routine 2570, the processor(s) 2550 of the control device 2500 may be caused to operate the network interface 2590 to coordinate, via the network 2999, post-processing operations performed, at least partially in parallel, by processors 2350 of multiple ones of the node device 2300 as a result of executing corresponding instances of the control routine 2340. More specifically, the processors 2550 may be caused to coordinate the distributed use of various forms of text analytics among the node devices 2300 to derive insights concerning the speech audio of the speech data set 3100.

Returning to FIG. 1A, in various embodiments, the requesting device 2700 may incorporate one or more of a processor 2750, a storage 2760, an input device 2720, a display 2780, and a network interface 2790 to couple the requesting device 2700 to the network 2999. The storage 2760 may store a control routine 2740, a text data set 3700 and/or text metadata 3779.

The control routine 2740 may incorporate a sequence of instructions operative on the processor 2750 to implement logic to perform various functions. In executing the control routine 2740, the processor 2750 may be caused to operate the input device 2720 and/or the display 2780 to provide a user interface (UI) by which an operator of the requesting device 2700 may transmit a request to the control device 2500 to request the provision of insights concerning the contents of speech audio stored as a specified one of the speech data sets 3100. The processor 2750 may be subsequently caused to similarly provide a UI by which the operator of the requesting device 2700 is able to view the text of that speech audio upon receipt of its transcript in the form of a text data set 3700 from the control device 2500, and/or is able to view the requested insights in a visualization. Again, in some embodiments, such visualizations may have been previously generated and then provided to the requesting device for presentation to convey such insights. Alternatively or additionally, the processor 2750 may be caused to generate such visualizations from information contained within the text metadata 3779.

Figure 2B:
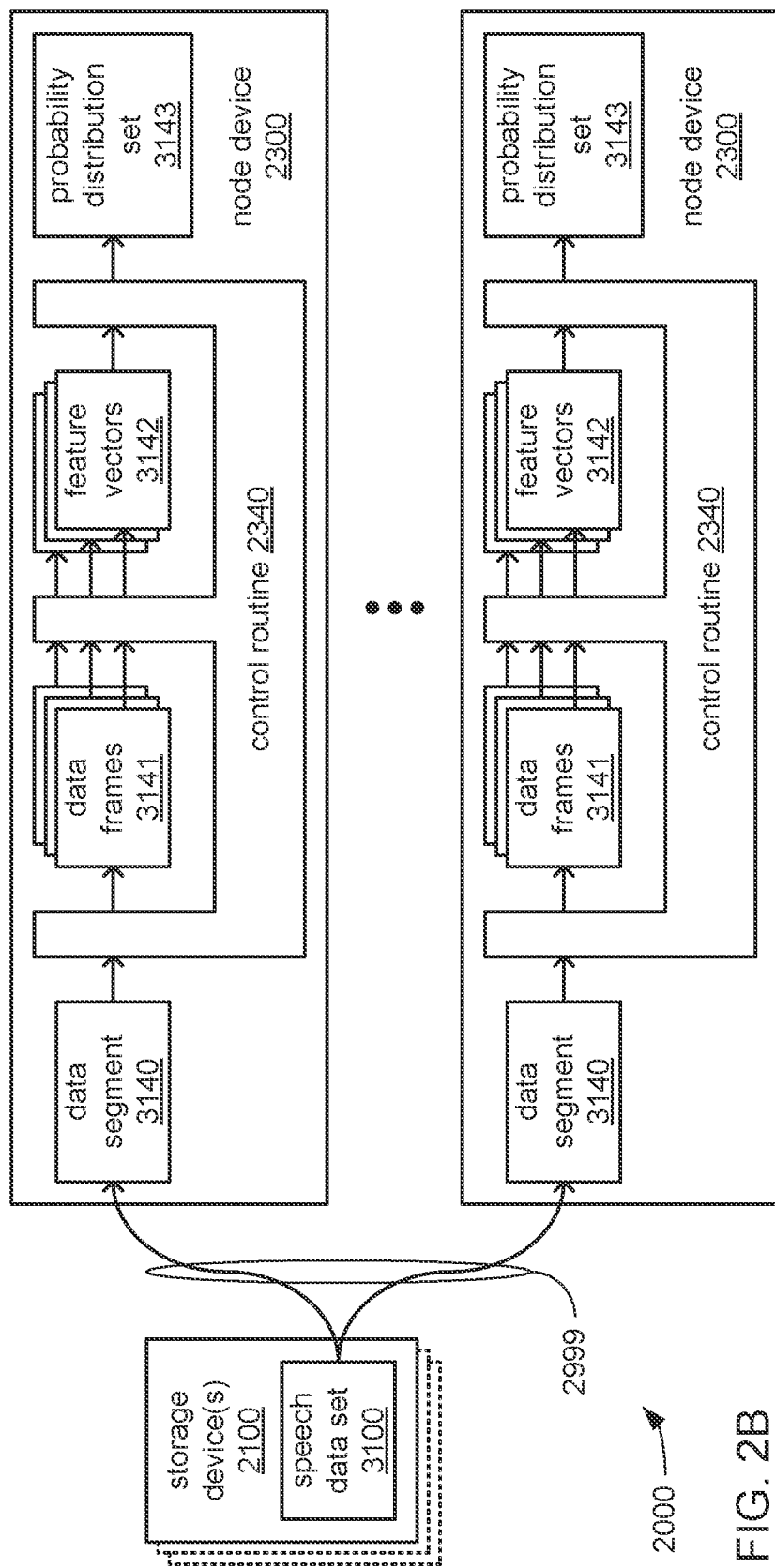
Figure 2C:
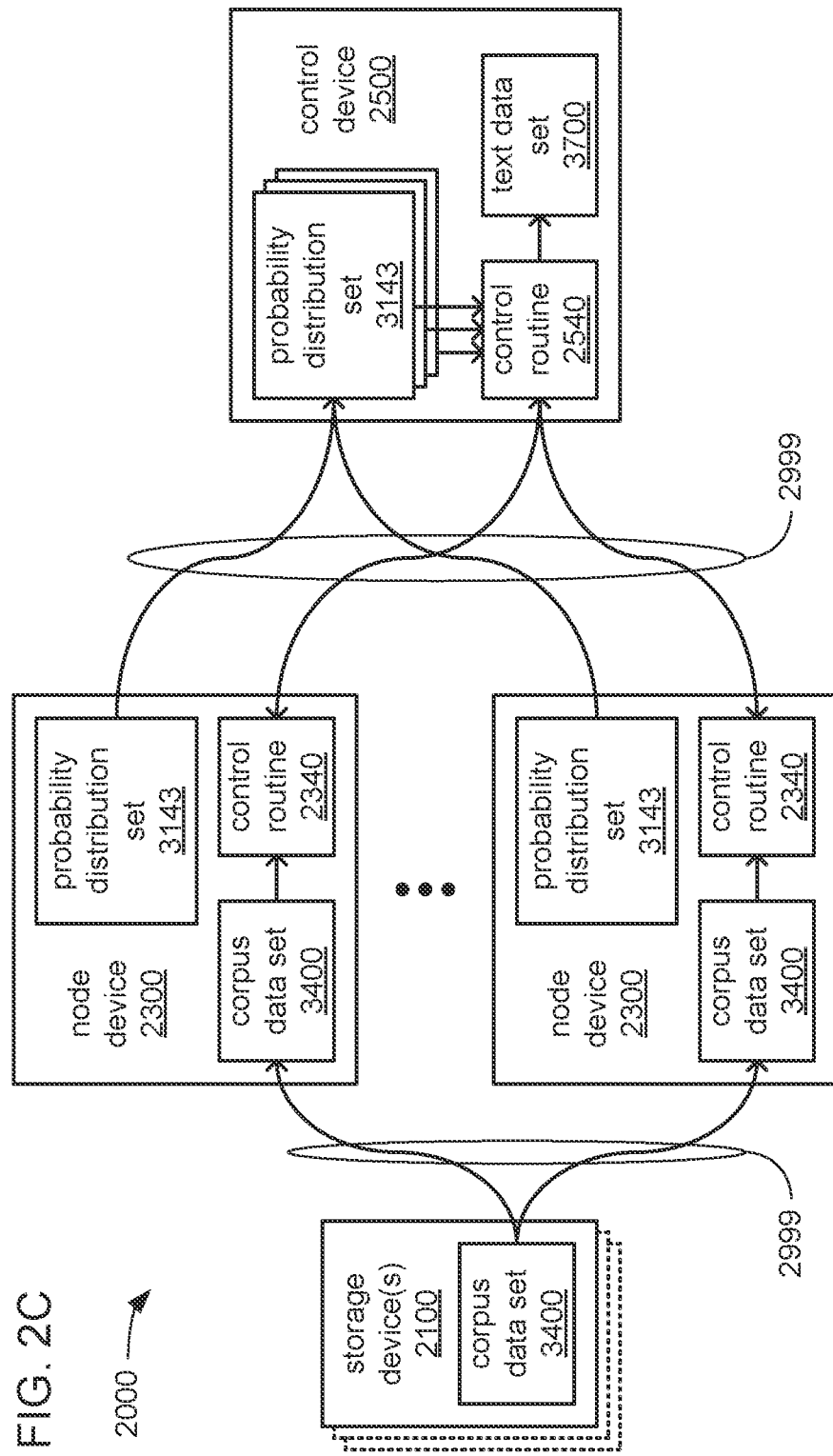
Figure 2D:
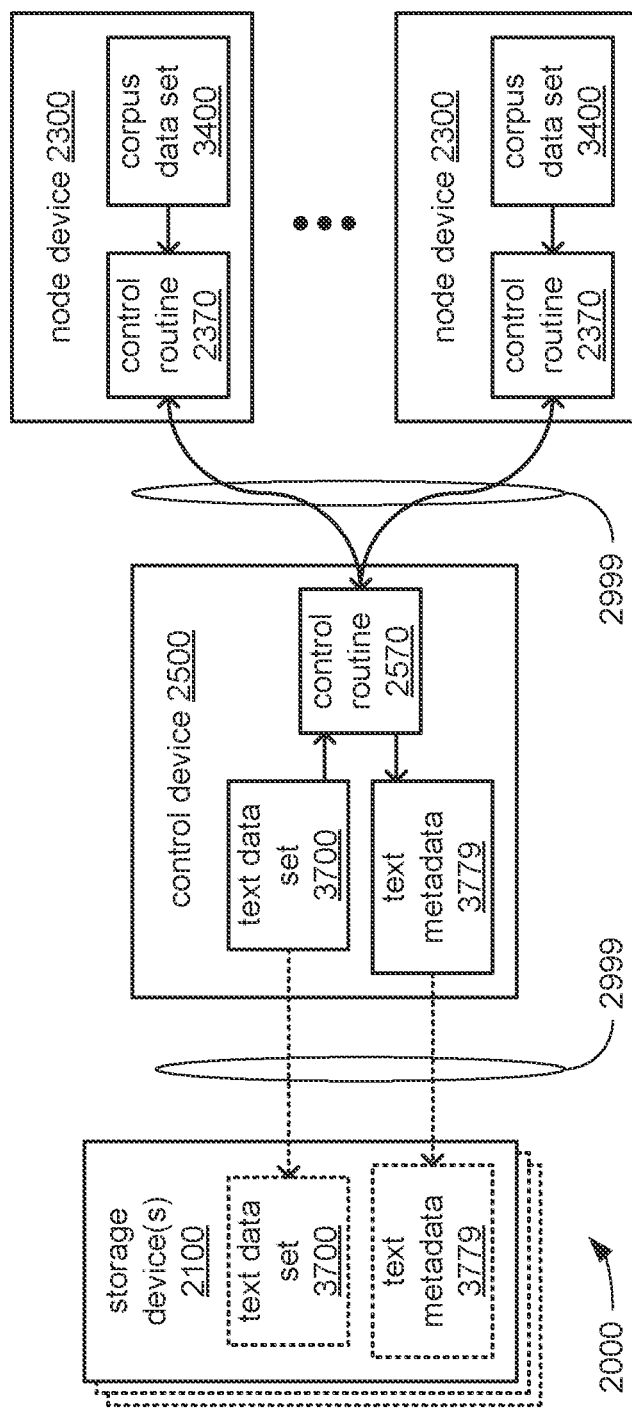
Figure 2E:
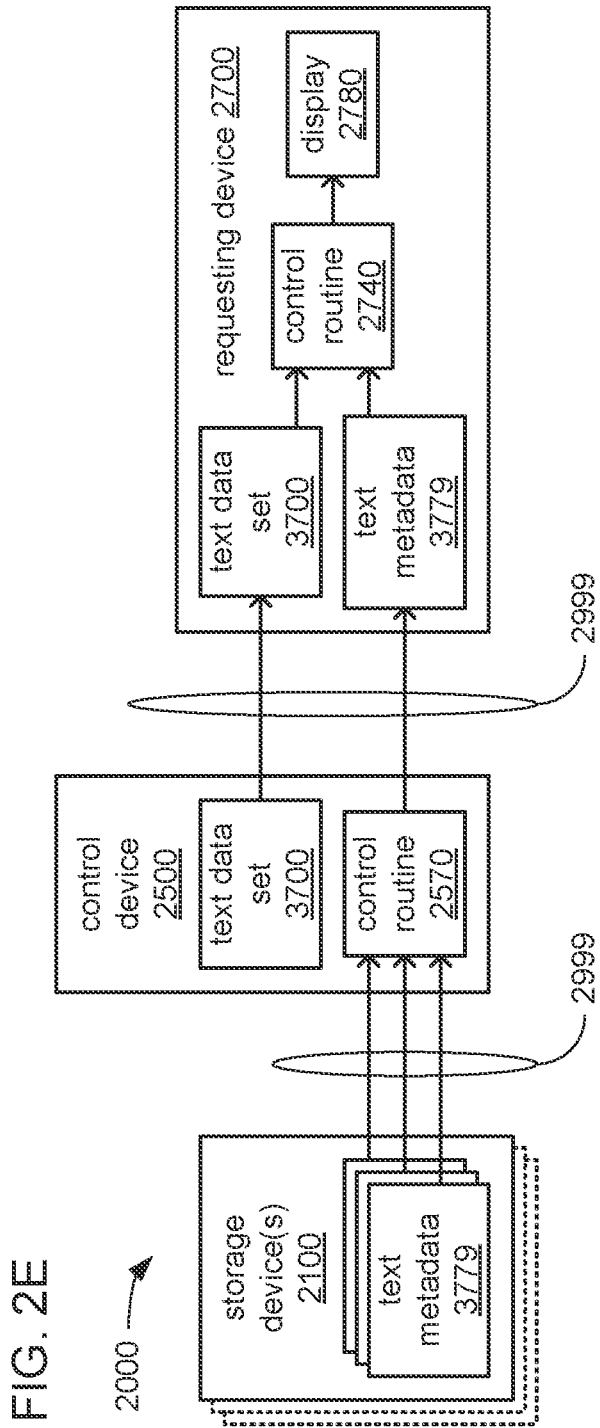

FIGS. 2A, 2B, 2C, 2D and 2E, taken together, illustrate, in greater detail, aspects of an end-to-end framework implemented within an embodiment of a distributed processing system 2000 to provide improved insights into the contents of speech audio. Within this end-to-end framework, various pieces of information concerning speech audio are routed through multiple processing operations in which data is analyzed and transformed in multiple ways to derive a transcript of the contents of the speech audio, and then to derive insights concerning those contents. FIG. 2A illustrates aspects of distributed pre-processing operations to determine the manner in which speech audio stored as a speech data set 3100 is to be divided into speech segments (represented as data segments 3140) for speech-to-text processing operations. FIGS. 2B-C illustrate aspects of distributed speech-to-text processing operations to generate a transcript (stored as a text data set 3700) of what was spoken in the speech audio, including the use of a corpus of a selected language (stored as a corpus data set 3400). FIGS. 2D-E illustrate aspects of distributed text analytics post-processing operations to derive insights (which may be stored as text metadata 3379) into the contents of the speech audio and/or to identify transcripts (stored as other text data sets 3700) of other related pieces of speech audio.

Turning to FIG. 2A, a speech data set 3100 representing speech audio spoken by one or more individuals in a digitally encoded form in storage may be divided into a set of multiple chunks of the speech audio of equal length, represented as a set of multiple data chunks 3110. The very same set of multiple data chunks 3110 may then be provided to each of multiple node devices 2300.

Within each of the multiple node devices 2300, a different segmentation technique may be performed to proceed through the multiple chunks of speech audio represented by the multiple data chunks 3110 to identify the longer pauses that typically occur between sentences. It should be noted that the division of the speech data set 3100 into the multiple data chunks 3110 may be necessary to accommodate input data size limitations imposed by one or more of the segmentation techniques. Different components of, and/or different versions of, the control routine 2310 may be executed within each of the multiple node devices 2300 to cause the performance of a different one of the multiple segmentation techniques within each of the multiple node devices 2300. In so doing, within each of the multiple node devices 2300, a corresponding different candidate set 3118 is generated of indications of where likely pauses between sentences have been identified as occurring throughout the entirety of the speech audio.

Each of the candidate sets 3118 of likely sentence pauses, following its generation within a different one of the multiple node devices 2300, may then be provided to the control device 2500. Within the control device 2500, execution of the control routine 2510 may cause the multiple candidate sets 3118 of likely sentence pauses to be combined in any of a variety of ways to derive the single converged set 3119 of likely sentence pauses.

Turning to FIG. 2B, following such pre-processing operations as are described just above, the same speech data set 3100 representing the same speech audio may be divided, again, but now into a set of multiple speech segments 3140. Unlike the division into multiple chunks of speech audio that did not in any way take into account the content of the speech audio, the division of the speech audio into multiple speech segments may be based on the indications of where sentence pauses have been deemed to be likely to be present within the speech audio, as indicated by the converged set 3119 of likely sentence pauses.

Also unlike the provision of the same full set of multiple data chunks 3110 to each of the multiple node devices 2300 in which a different segmentation technique was performed, each of multiple node devices 2300 may be provided with one or more different ones of the data segments 3140. Within each of the multiple node devices 2300 that are provided with at least one of the data segments 3140, execution of the control routine 2340 may cause each such provided data segment 3140 to be divided into multiple data frames 3141 of equal length. In so doing, the speech segment represented by each of such data segments 3140 is divided into multiple speech frames that are each represented by one of the data segments 3141. It should be noted that, since each of the data segments 3140 are likely to be of a different size (as a result of each of the speech segments represented thereby likely being of a different temporal length), the division of each data segment 3140 into multiple data frames 3141 may result in different quantities of data frames 3141 being generated from each data segment 3140.

Following the division of a data segment 3140 into multiple data frames 3141 within each of the multiple node devices 2300, each of those data frames 3141 may then be subjected to feature detection in which the speech frame represented by each is analyzed to identify any occurrences of one or more selected acoustic features therein. For each data frame 3141, a corresponding feature vector 3142 may be generated that includes indications of when each identified acoustic feature was found to have occurred within the corresponding speech frame. Each feature vector 3142 of the resulting set of feature vectors 3142 corresponding to the set of data frames 3141 of a single segment 3140 may then be provided as an input to an acoustic model that is caused to be implemented within each of the multiple node devices 2300 by further execution of the control routine 2340. The acoustic model may map each occurrence of a particular acoustic feature, or each occurrence of a particular sequence of acoustic features, to one or more graphemes that may have been pronounced and/or to a pause that may have occurred. More specifically, for each feature vector 3142, the acoustic model may generate one or more probability distributions of one or more graphemes (which may correspond to one or more phonemes that may be represented by corresponding text character(s)) that were pronounced, and/or one or more pauses that occurred within the corresponding speech frame. The probability distributions so derived from all of the feature vectors that correspond to a single speech segment may be assembled together in temporal order to form a single probability distribution set 3143 that corresponds to that single speech segment.

Turning to FIG. 2C, each of the probability distribution sets 3143, following its generation within a different one of the multiple node devices 2300, may then be provided to the control device 2500. Also, each of the multiple node devices 2300 may be provided with a complete copy of a corpus data set 3400 that includes an n-gram language model.

Within the control device 2500, execution of the control routine 2540 may cause the probability distributions of graphemes and/or of pauses within each of the probability distribution sets 3143 to be analyzed in temporal order to derive a set of up to a pre-selected quantity of candidate words that are each among the words that are each more likely to be the next word that was spoken. Each word of this set of candidate words may then be combined with up to a pre-selected quantity of earlier-identified preceding words to form a corresponding set of candidate n-grams that are to be searched for within the corpus data set 3400. The set of candidate n-grams may then be provided to the multiple node devices 2300 to enable the performance of a beam search through the corpus of the corpus data set 3400 in a distributed manner across the multiple node devices 2300, as will be explained in greater detail.

Within each of the multiple node devices 2300, in executing the control routine 2340, a different subset of the set of candidate n-grams is searched for within the corpus represented by the corpus data set 3400, as will also be explained in greater detail. Within each of the multiple node devices 2300, as the probability for each candidate n-gram of the subset is retrieved from the corpus of the corpus data set 3400 as a result of the search, indications of those probabilities may be transmitted back to the control device 2500.

Within the control device 2500, following the receipt of the probabilities for all of the candidate n-grams within the set of candidate n-grams from the node devices 2300, the one candidate n-gram within the set that has the highest probability may be identified. In so doing, the corresponding candidate word out of the set of candidate words is selected as being the word that was mostly likely the next word spoken. That word may then be added to the transcript of the speech audio of speech data set 3100, which may be stored within the control device 2500 as a text data set 3700.

Turning to FIG. 2D, following the generation of a complete transcript of what was said in the speech audio of the speech data set 3100, the transcript may be stored within the one or more storage devices 2100 as the corresponding text data set 3700. The text data set 3700 may include an identifier of the speech data set 3100 from which the transcript of the text data set 3700 was derived.

Within the control device 2500, in executing the control routine 2570, various post-processing analyses may be performed of the text within the transcript to identify such features as the one or more topics that were spoken about, the relative importance of each topic, indications of sentiments, etc. More specifically, using the transcript of the text data set 3700 as an input, one or more terms within the transcript (each including one or more words) may be identified as having one or more quantifiable characteristics (e.g., counts of occurrences of each term and/or aggregate counts of multiple terms, degree of relevance of a term within the transcript, degree of strength of positive or negative sentiment about a term, etc.), and/or relational characteristics (e.g., semantic and/or grammatical relationships among terms, whether detected sentiment about a term is positive or negative, etc.)

In some embodiments, the entirety of the transcript may be provided to each of multiple ones of the node devices to enable each to perform a different post-processing analysis on the entirety of the transcript. As part of one or more of such analyses, sets of n-grams from the transcript may be provided to the multiple node devices 2300 to be searched for within the corpus data set 3400 as part of using n-gram probabilities in identifying topics, indications of sentiments about topics, etc. Regardless of the exact types of text analyses that are performed, and regardless of the exact manner in which each text analysis is performed, the various insights that may be derived from such analyses may be assembled as corresponding text metadata 3779 that may also be stored within the one or more storage devices 2100.

Turning to FIG. 2E, following the derivation of the text metadata 3779 corresponding to the text data set 3700, further execution of the control routine 2570 may cause the retrieval of text metadata 3779 corresponding to other text data sets 3700 that correspond to other speech data sets 3100. Such other text metadata 3779 may be analyzed to identify relationships among words, text chunks, utterances, topics, etc. that may lead to the identification of other text data sets 3700 generated from other speech data sets 3100 that may be deemed to be related.

In further executing the control routine 2570, the control device 2500 may be cause to provide the text data set 3700, the corresponding text metadata 3779, and/or text metadata 3779 of other related speech data set(s) 3100 and/or text data set(s) 3700 to the requesting device 2700. It may be that the request to provide various insights into what was spoken in the speech audio of the speech data set 3100 was received by the control device 2500 from the requesting device 2700. In executing the control routine 2740, images of the transcript of the text data set 3700, various visualizations of aspects of the contents thereof indicated in the corresponding text metadata 3779, and/or visualizations of identified relationships to other transcripts of other speech audio may be presented to an operator of the requesting device 2700.

Figure 3A:
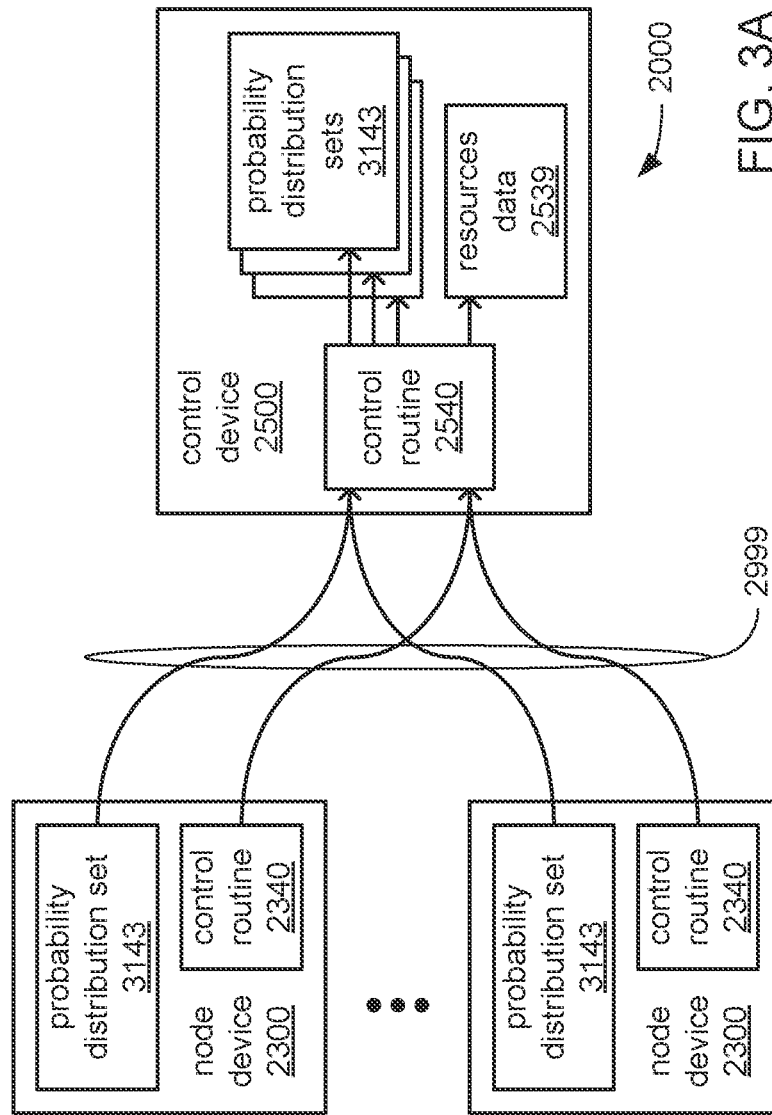
FIGS. 3A, 3B, 3C, 3D, 3E and 3F, together, illustrate aspects of the use of a language model based on a larger than commonplace n-gram corpus as part of performing speech-to-text processing operations within an implementation of the framework of FIGS. 2A-E.
Figure 3B:
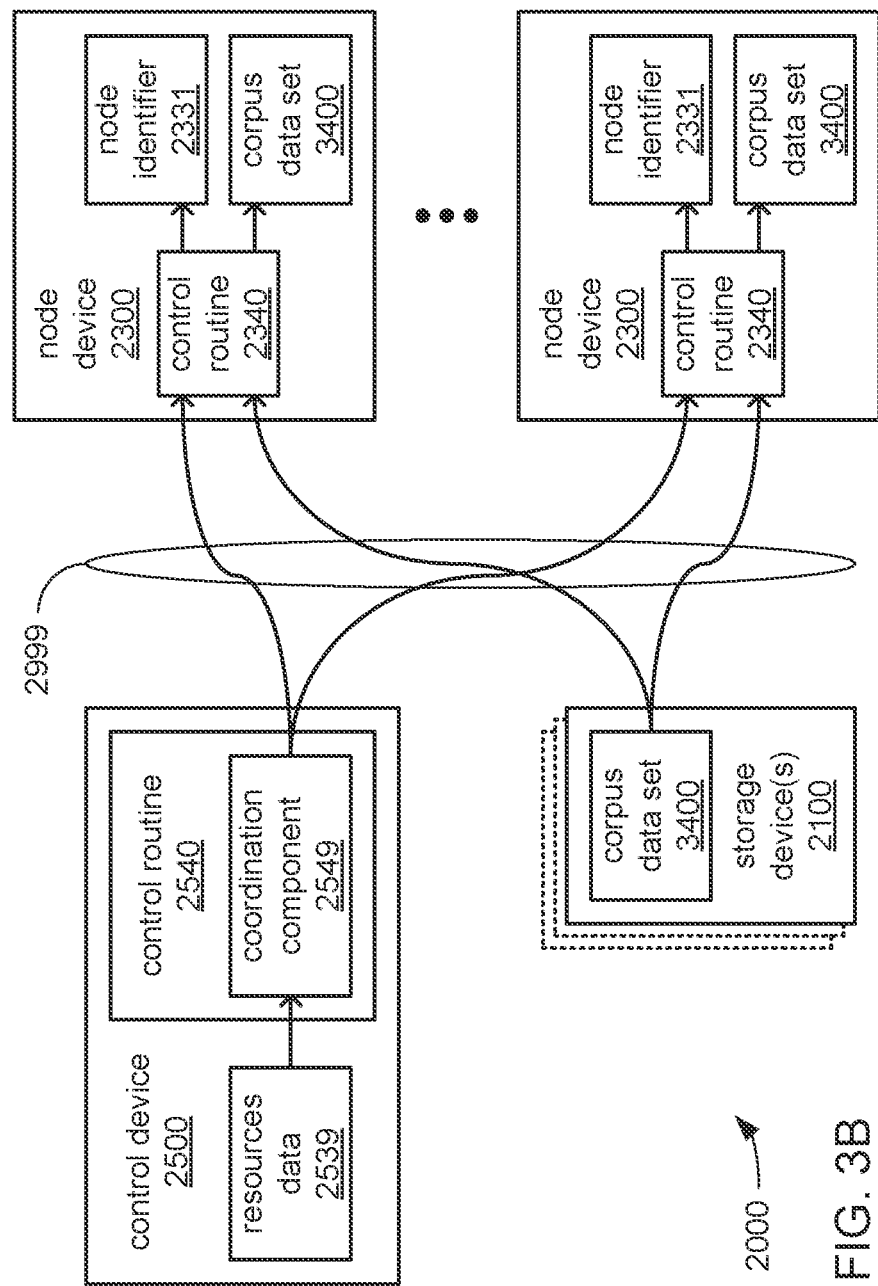
Figure 3C:
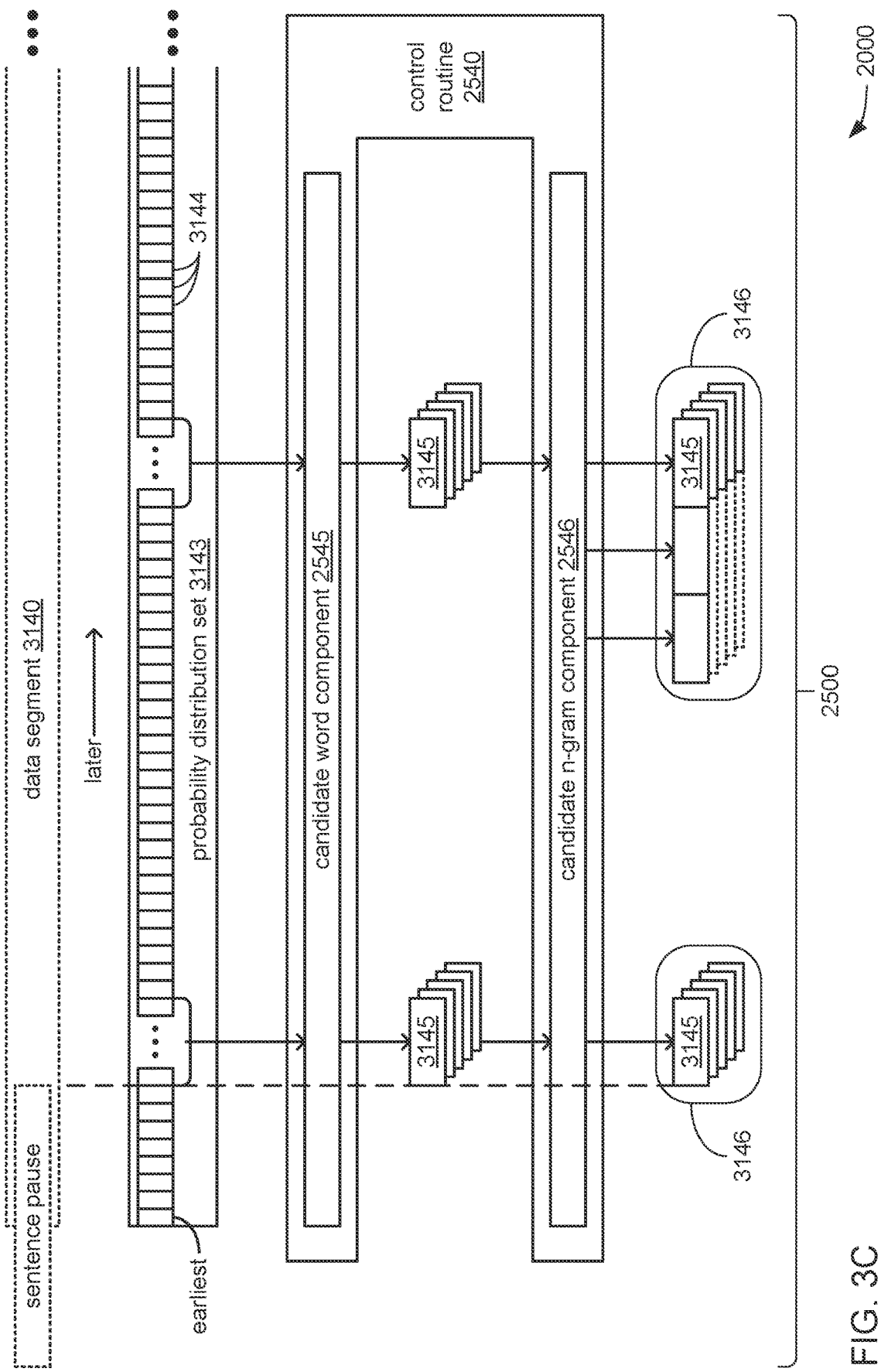
Figure 3D:
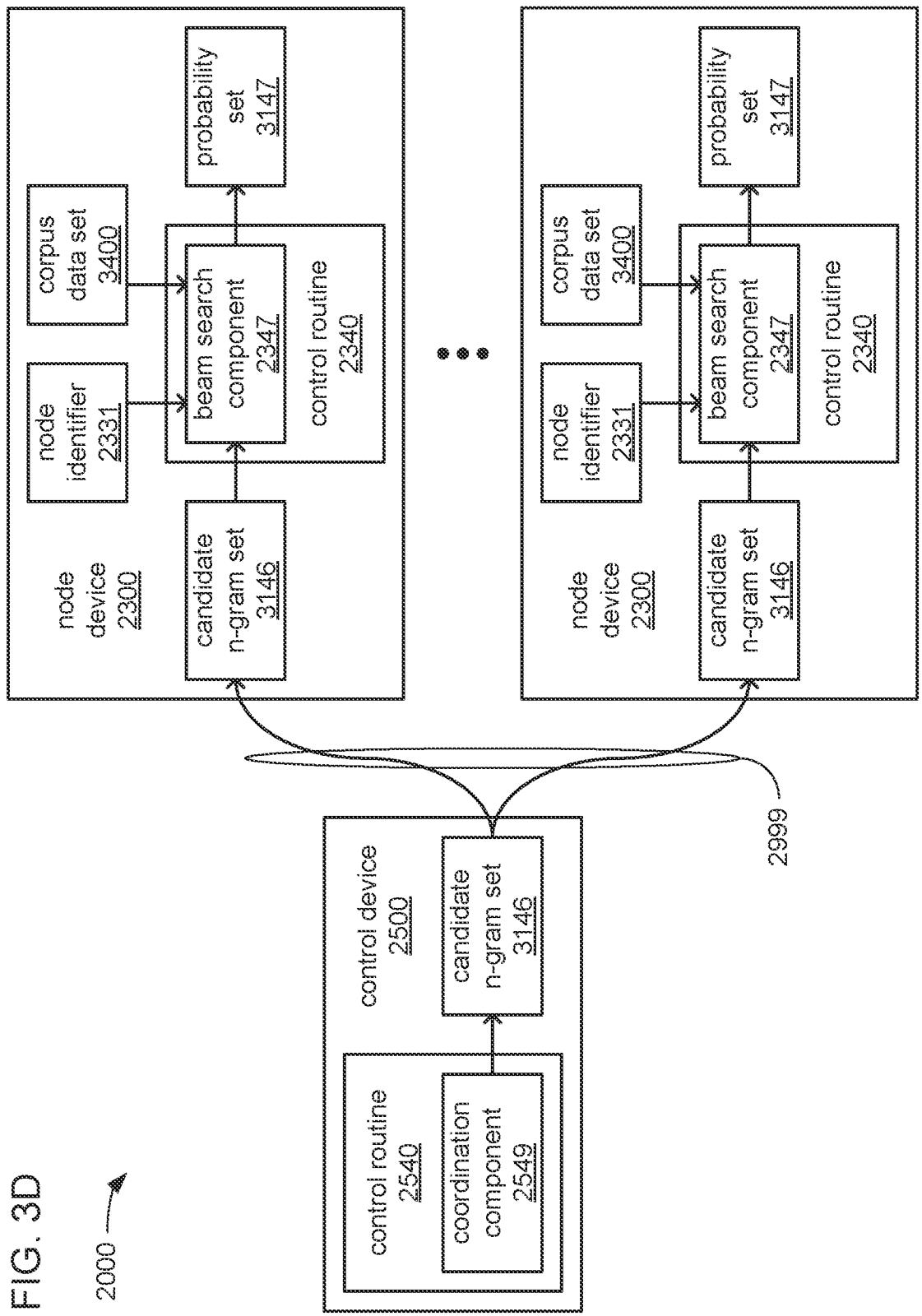
Figure 3E:
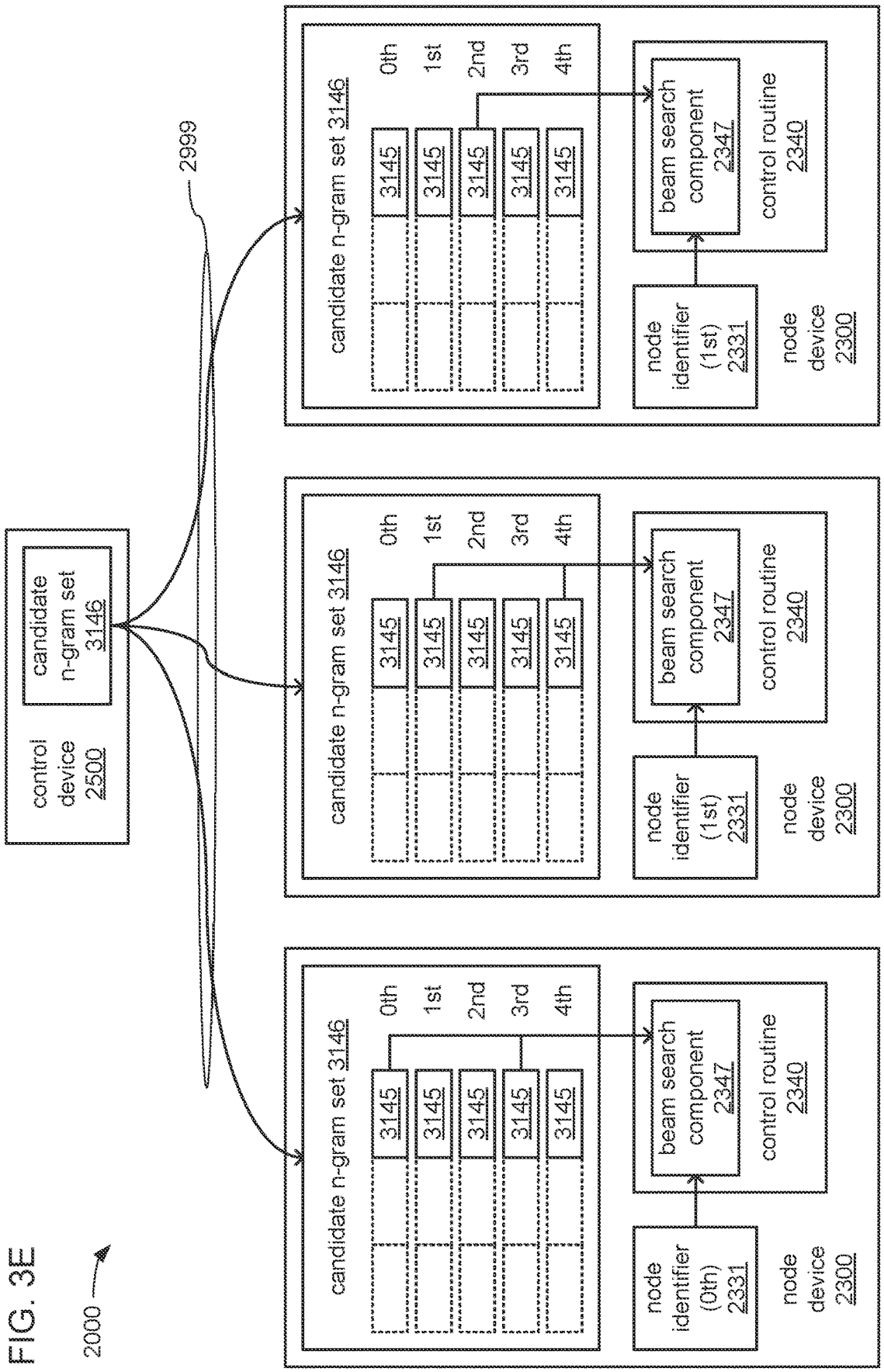
Figure 3F:
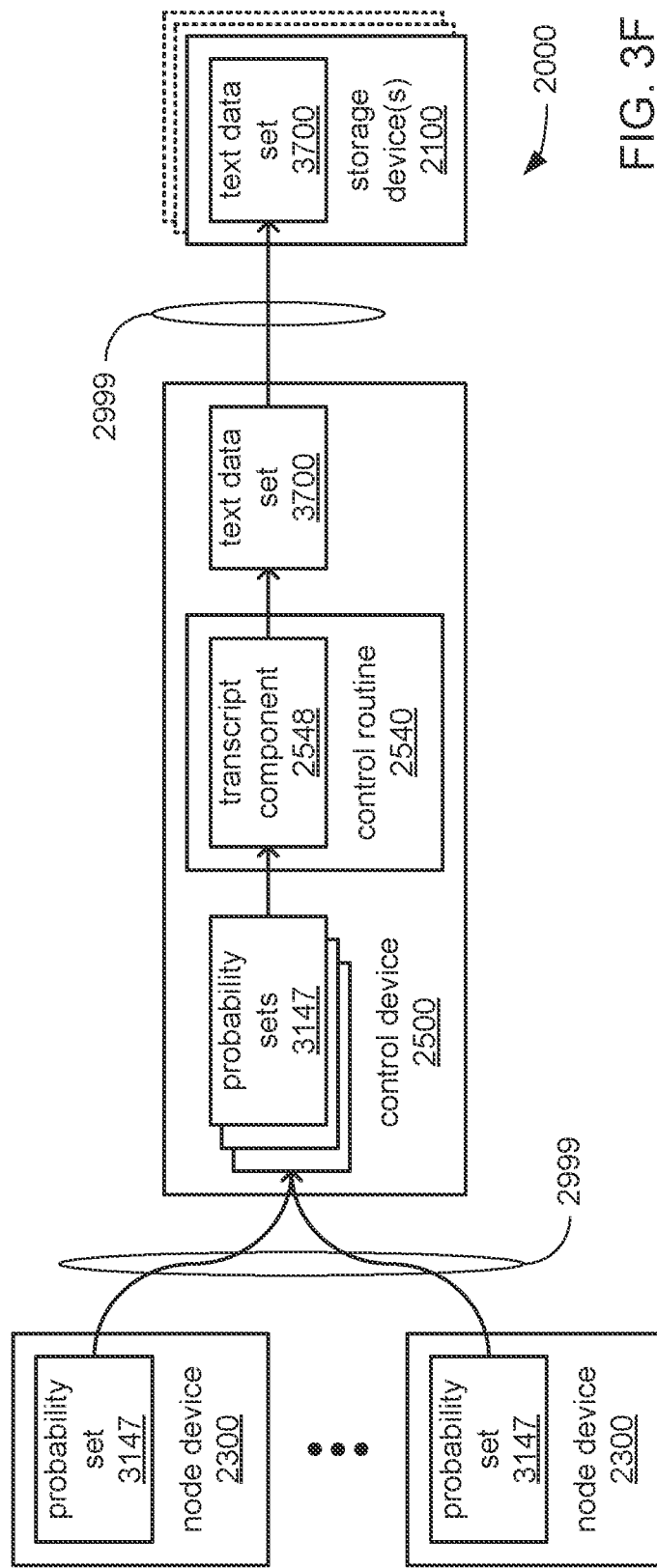

FIGS. 3A, 3B, 3C, 3D, 3E and 3F, taken together, illustrate, in greater detail, portions of speech-to-text processing operations performed within an embodiment of a distributed processing system 2000 as part of providing improved insights into the contents of speech audio. More specifically, FIGS. 3A-F present, in greater detail, aspects of operations described above in connection with FIG. 2C. FIG. 3A illustrates aspects of the collection and ordering of probability distribution sets 3143 from multiple node devices 2300, as well as the collection of indications of the status of each of multiple node devices 2300. FIG. 3B illustrates aspects of the provision of copies of a corpus data set 3400 and individual node identifiers 2311 to each one of multiple node devices 2300. FIG. 3C illustrates aspects of the generation of candidate n-gram sets 3146. FIGS. 3D-E illustrate aspects of the performance of a distributed beam search within the corpus data set 3400 among multiple node devices 2300 to derive probability sets 3147. FIG. 3F illustrates aspects of the collection and use of probability sets 3147 to determine another word to add to a transcript stored as a text data set 3700.

As will be familiar to those skilled in the art, the use of an n-gram language model has become commonplace in speech-to-text processing. Such use of an n-gram language model is often based on an assumption that the next word in a transcript of speech audio is able to be identified with a relatively high degree of accuracy based on what word or words immediately preceded it. Also, it has also be found that the accuracy of the identification of the next word is able to be increased by increasing the quantity of immediately preceding words that are used as the basis for that identification. Unfortunately, as will also be familiar to those skilled in the art, each increase in the quantity of immediately preceding words by a single word can result in an exponential increase in the size of the corpus of n-grams that must be used. As a result, although there have been experimental implementations of speech-to-text processing that have used an n-gram language model supporting up to as many as 10 immediately preceding words, the amount of time, storage and processing resources required often make such an implementation impractical. Therefore, it is more commonplace to employ a quantity 3, 4 or 5 immediately preceding words.

However, FIGS. 3A-3F depict aspects of implementing and using an n-gram language model within an embodiment of the distributed processing system 2000 that is able to practically support the use of a higher quantity of immediately preceding words. More specifically, and as will shortly be explained, the processing, storage and/or other resources of multiple computing devices may be employed in a cooperative manner to make the use of a higher quantity of immediately preceding words in an n-gram language model in speech-to-text processing significantly more practical.

As previously discussed in conjunction with FIG. 2B, among the speech-to-text processing operations that may be performed may be the use of an acoustic model to generate probability distributions of what graphemes (which again, may correspond to one or more phonemes represented by text character(s)) may have been pronounced during each of multiple speech frames within a speech segment. As also discussed, for each such speech segment, the probability distributions derived from the corresponding multiple speech frames may be assembled into a single probability distribution set 3143 that corresponds to that speech segment. Again, such operations may be performed, at least partially in parallel, across multiple ones of the node devices 2300.

Turning to FIG. 3A, each of the probability distribution sets 3143 may be provided to the control device 2500 through the network 2999 as they are generated, at least partially in parallel, within multiple node devices 2300. Within the control device 2500, execution of the control routine 2540 may cause processors 2550 of the control device 2500 to organize the probability distribution sets 3143 in temporal order in preparation for being used with a language model to identify words for inclusion in a transcript of the contents of the speech audio.

As also depicted, each of the node devices 2300 may also provide the control device 2500 with indications of the availability of their processing, storage and/or other resources. Such indications may be used to augment and/or update resources data 2539. It should be noted that such indications may be received from one(s) of the node devices 2300 that are not engaged in generating the probability distribution sets 3143, as well as from the node devices 2300 that are so engaged.

Turning to FIG. 3B, further execution of the control routine 2540 may cause processor(s) 2550 of the control device 2500 to select particular ones of the node devices 2300 for use in performing beam searches of a corpus data set 3400 based on indications in the resources data 2539 of the levels of available resources within each of the node devices 2300. With such selections made, unique node identifiers 2331 may be transmitted to each of the selected node devices 2300. The node identifiers 2331 may be a continuous series of positive integers of increasing value, starting with 0, and incremented by 1.

In executing a coordination component 2549, processor(s) 2550 of the control device 2500 may be caused to cooperate with processors 2350 of the node devices 2300 to coordinate communications through the network 2999 to cause the provision of complete copies of the corpus data set 3400 for a pre-selected language from the one or more storage devices 2100 to each of the selected node devices 2300.

Turning to FIG. 3C, within the control device 2500, the processor(s) 2550 may iterate sequentially through individual probability distributions 3144 within a probability distribution set 3143, starting with the temporally earliest thereof, and proceeding in temporal order through progressively later ones thereof. As previously discussed, the speech segments (each of which is represented in storage by a corresponding data segment 3140) may be formed by dividing the speech audio of a speech data set 3100 at midpoints amidst what are determined to be likely sentence pauses. Thus, as depicted, the speech segment (again, represented by a data segment 3140) that corresponds to the depicted probability distribution set 3143 may begin with a first few consecutive speech frames in which there may be no speech sounds, as would be expected for a likely sentence pause. As a result, each of the corresponding first multiple consecutive probability distributions 3144 (including the earliest thereof) may indicate that a grapheme (e.g., a text character) for an empty space has the highest probability of having occurred within the corresponding speech frame.

Following such consecutive probability distributions 3144 associated with a likely sentence pause, there may then be the first of multiple consecutive probability distributions 3144 that may be associated with the pronunciation of the letters of the first word of a sentence (the transition from probability distributions 3144 associated with a likely sentence pause to probability distributions 3144 that may be associated with pronouncing a word is marked in FIG. 3C by vertical dashed line). In executing a candidate word component 2545, processor(s) 2550 of the control device 2500 may, based on those multiple consecutive probability distributions 3144, derive a pre-selected quantity of candidate words 3145 that are each among the most likely to be the first word that was spoken throughout the corresponding multiple consecutive speech frames. The processor(s) 2550 may then be caused by execution of a candidate n-gram component 2546 to convert the set of candidate words 3145 into a candidate n-gram set 3146 by adding up to a pre-selected quantity of words that were previously identified as the immediately preceding words in what may be a sentence that corresponds to the probability distribution set 3143. However, since each of the candidate word 3145 is preceded by what is deemed to be a likely sentence pause, there may be no such preceding words to be added such that the resulting candidate n-gram set 3146 contains a set of unigrams that are each just one of the candidate words 3145.

FIG. 3C also depicts another example set of candidate words 3145 being derived from multiple consecutive probability distributions 3144 at a temporally later location within the depicted probability distribution set 3143 that may be associated with pronouncing another word at a later time within corresponding speech segment. Again, in executing the candidate word component 2545, processor(s) 2550 of the control device 2500 may, based on those multiple consecutive probability distributions 3144, derive another pre-selected quantity of candidate words 3145 that are each among the most likely to be the word that was spoken throughout these other corresponding multiple consecutive speech frames. The processor(s) 2550 may then be caused by execution of a candidate n-gram component 2546 to convert this other set of candidate words 3145 into another candidate n-gram set 3146 by adding up to the pre-selected quantity of words that were previously identified as the immediately preceding words in what may be a sentence that corresponds to the probability distribution set 3143. Unlike the previously discussed set of candidate words 3145, there may be multiple immediately preceding words that were spoken up to the point at which one of the candidate words 3145 within this other set of candidate words 3145. Therefore, the other candidate n-gram set 3146 may include up to the pre-selected quantity of words.

Turning to FIG. 3D, regardless of whether the n-grams within a candidate n-gram set 3146 generated within the control device 2500 include any immediately preceding words ahead of the candidate words 3145 thereof, in executing the coordination component 2549, the processor(s) 2550 of the control device 2500 may be caused to provide complete copies of each of the candidate n-gram sets 3146, in temporal order, to all of the selected node devices 2300. Within each of the selected node devices 2300, execution of a beam search component 2347 may cause the processor(s) 2350 thereof to perform a beam search within the corpus data set 3400 for one or more of the n-grams present within the candidate n-gram set 3146. As will be familiar to those skilled in the art of n-gram language models, each n-gram within an n-gram corpus may be accompanied therein with an indication of the relative frequency of its occurrence and/or its relative probability of occurrence within texts of a particular language (based on the sample texts of the particular language used in generating the n-gram corpus).

Referring to FIG. 3E, in addition to FIG. 3D, it should be noted that each of selected node devices 2300 is caused to perform a beam search for different one(s) of the n-grams within the candidate n-gram set 3146, such that no two of the selected node devices 2300 are caused to perform a beam search for the same n-gram. In some embodiments, this may be effected through the use of modulo calculations in which, within each of the selected node devices 2300, the numerical designation of the position occupied by each n-gram within the candidate n-gram set 3146 is divided by the quantity of the selected node devices 2300 to derive a modulo value for each n-gram within the candidate n-gram set 3146. The modulo value calculated for each n-gram is then compared to the unique node identifier 2331 that was earlier assigned to the selected node device 2300. The n-gram(s) that are searched for within each of the selected node devices 2300 are the one(s) for which the modulo value matches the unique node identifier 2331 for that node device 2300.

Thus, as depicted (in the deliberately simplified example in FIG. 3E in which there are only three selected node devices 2300), within the selected node device 2300 that has been assigned the "0" node identifier 2331, the n-grams at the "0th" and "3rd" positions within the candidate n-gram set 3146 are searched for within the corpus data set 3400 stored therein. Correspondingly, within the selected node device 2300 that has been assigned the "1" node identifier 2331, the n-grams at the "1st" and "4th" positions within the candidate n-gram set 3146 are searched for within the corpus data set 3400 stored therein. Also correspondingly, within the selected node device 2300 that has been assigned the "2" node identifier 2331, the n-gram at the "2nd" position within the candidate n-gram set 3146 is searched for within the corpus data set 3400 stored therein. In this way, a relatively even distribution of n-grams to be searched for within the corpus data set 3400 across the multiple selected node devices 2300 is achieved with relatively minimal communication across the network 2999.

Also, by providing each of the selected node devices 2300 with a complete copy of the entire corpus data set 3400, all processing operations for the beam search for each n-gram are performed entirely within a single node device 2300 without need for communications with any other device through the network 2999. This entirely eliminates the need for network communications among the selected node devices 2300 to carry out any of the beam searches, thereby reducing consumption of network bandwidth and eliminating the expenditure of time that would occur while such communications take place.

Further, such distribution of beam searches among multiple computing devices enables the corpus data set 3400 to be of considerably larger size versus the maximum size that would be practical and/or possible were just a single computing device used. As will be familiar to those skilled in the art, the ability to more efficiently perform a greater quantity of beam searches in less time, thereby enabling the use of a larger corpus, may advantageously permit a corpus to include more lower frequency n-grams (i.e., n-grams that have a relatively low probability of occurring within texts of a particular language) and/or to include n-grams with a greater quantity of words per n-gram.

Focusing again more specifically on FIG. 3D, within each of the selected node devices 2300, as each n-gram is found within the corpus data set 3400, an indication of the relative probability of that n-gram occurring may be stored within a probability set 3147 generated for all of the n-grams for which a beam search is performed within that selected node device 2300. In some embodiments, where a particular n-gram is not found within the corpus data set 3400, an indication of default value for the relative probability of the occurrence of an "unknown" n-gram may be stored within the probability set 3147.

Turning to FIG. 3F, each of the probability sets 3147 may be provided to the control device 2500 through the network 2999 as they are generated, at least partially in parallel, within multiple node devices 2300. Within the control device 2500, execution of a transcript component 2548 may cause processor(s) 2550 of the control device 2500 to, based on the indications of the relative probabilities retrieved for each n-gram within the candidate n-gram set 3146, identify the word that was most likely spoken. The identified most likely spoken word may then be added to the transcript of the speech audio. Upon completion of the generation of the transcript, the control device 2500 may provide it to the one or more storage devices 2100 to be persistently stored therein as a text data set 3700.

Figure 4A:
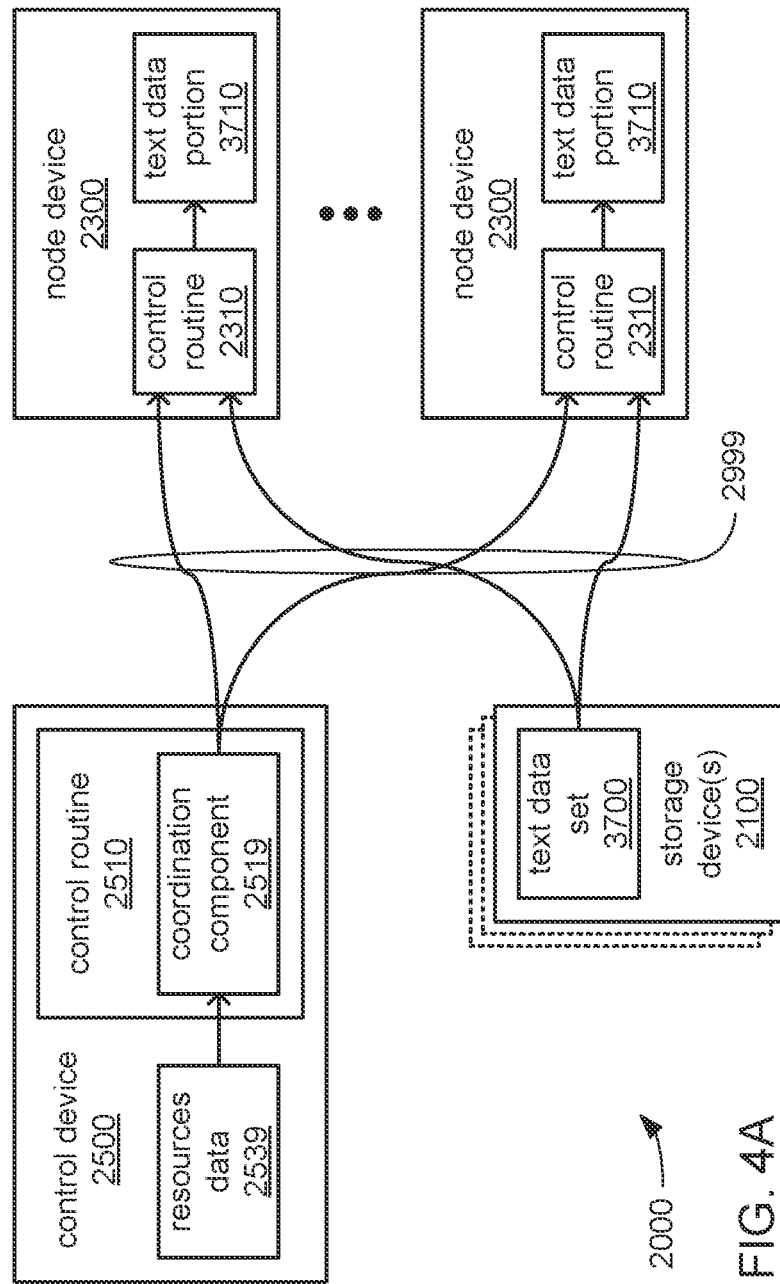
Figure 4B:
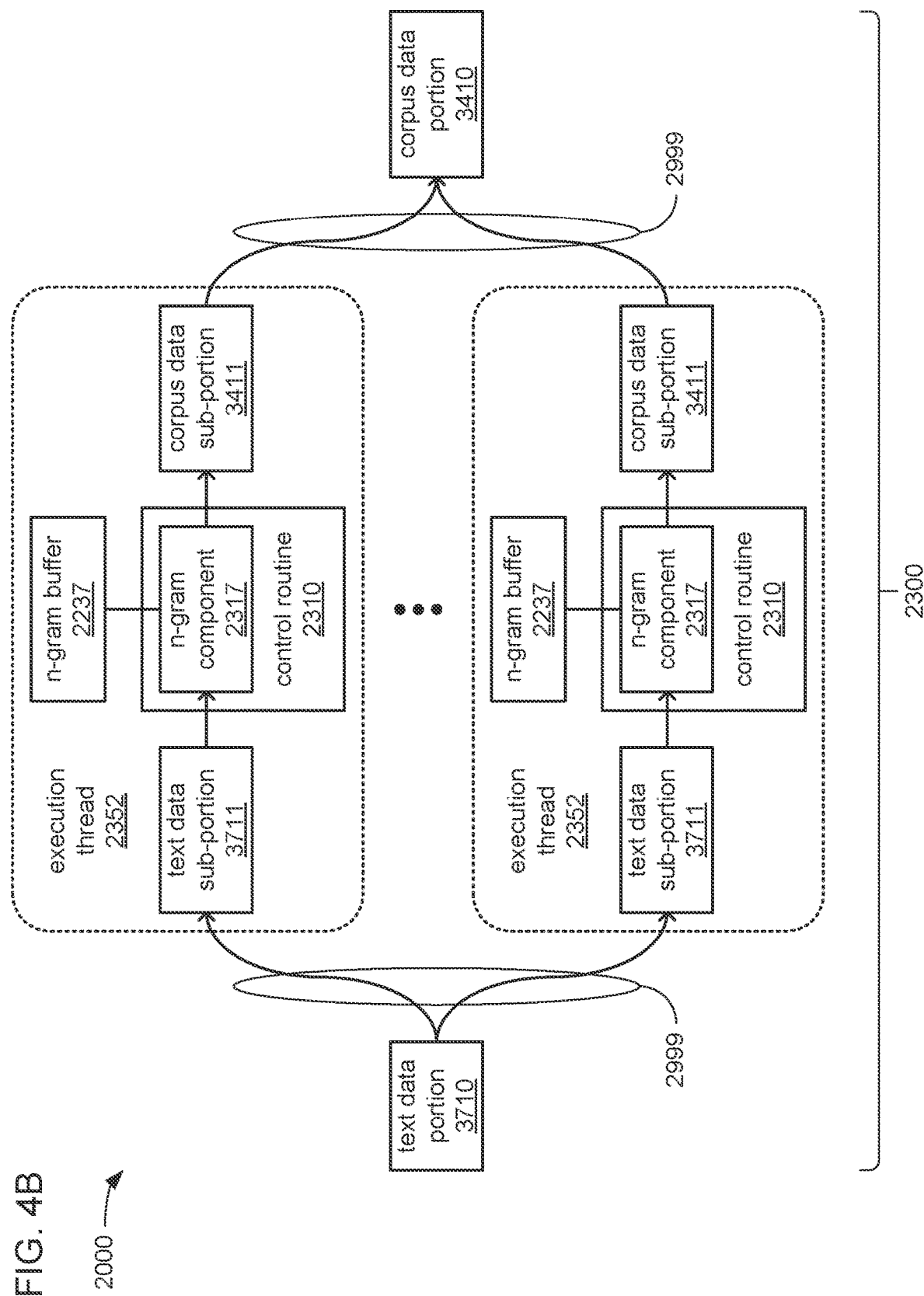
Figure 4C:
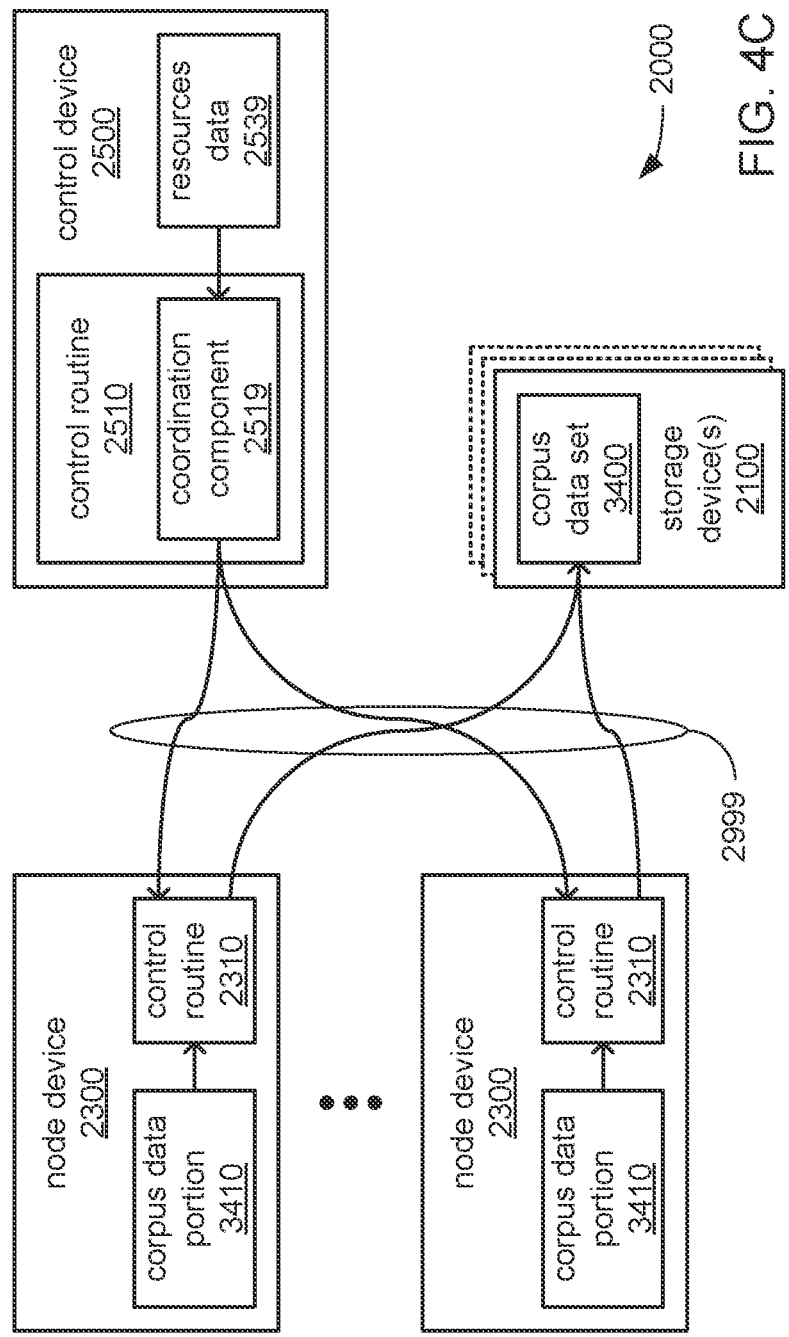
Figure 4E:
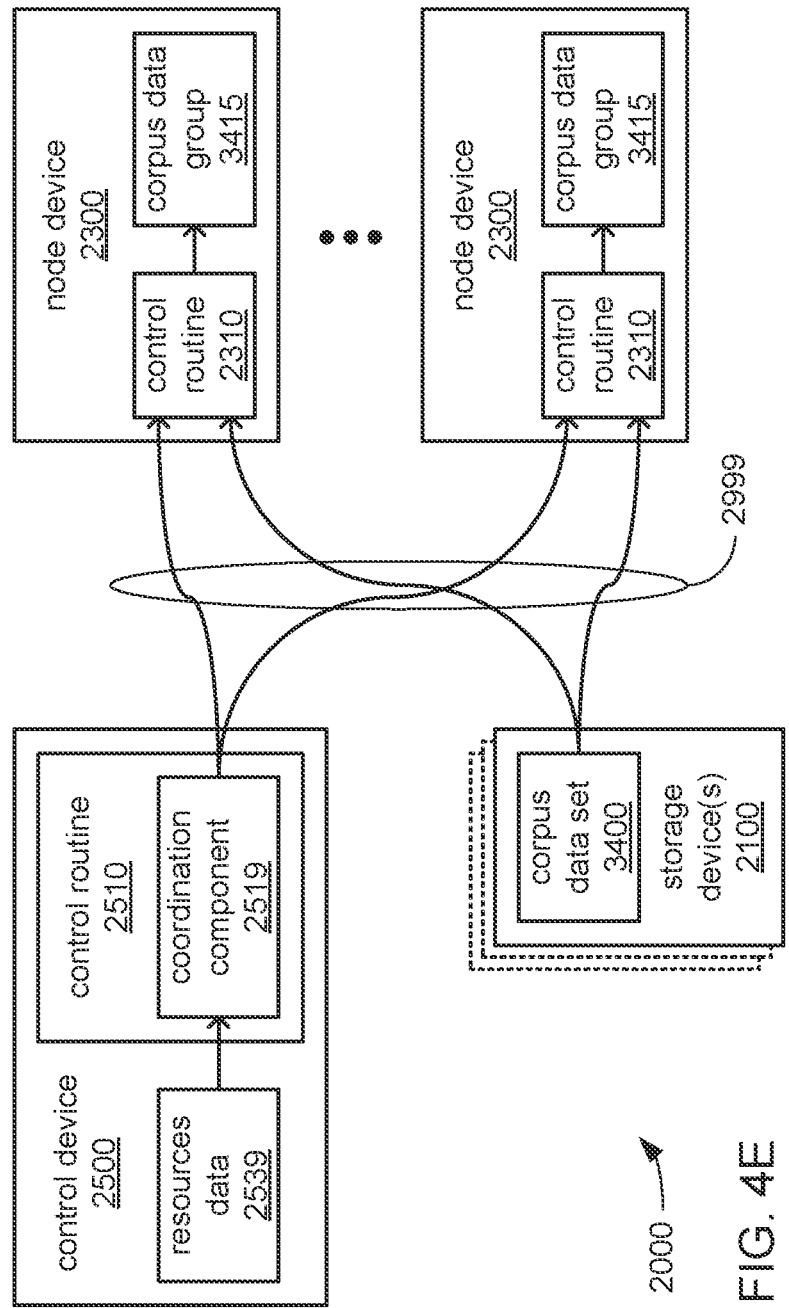

FIGS. 4A, 4B, 4C, 4D, 4E, 4F and 4G, taken together, illustrate, in greater detail, aspects of the generation and/or augmentation of an n-gram corpus implementing an n-gram language model. More specifically, FIGS. 4A-F present, in greater detail, aspects of the generation and/or augmentation of a corpus data set 3400 based on the contents of a text data set 3700. FIG. 4A illustrates aspects of the distribution of portions of a selected text data set 3700 among multiple node devices 2300 in preparation for the generation of n-grams therefrom. FIG. 4B illustrates aspects of the generation of a portion of an n-gram corpus from each of the portions of the selected text data set 3700. FIGS. 4C-D illustrate aspects of the collection and combining of the generated portions of n-gram corpus to either form an entirely new corpus data set 3400, or augment an existing corpus data set 3400. FIG. 4E illustrates aspects of the distribution of portions of the new or augmented corpus data set 3400 among multiple node devices 2300 in preparation for the deduplication of n-grams therein. FIGS. 4F-G illustrate aspects of the collection and re-combining of the deduplicated portions of the corpus data set 3400, and the calculation and/or re-calculation of relative frequencies and/or probabilities of occurrence of each of the n-grams therein.

Turning to FIG. 4A, within the control device 2500, execution of the control routine 2510 may cause processor(s) 2550 thereof to select particular ones of the node devices 2300 for use in performing operations to generate or augment an n-gram corpus from a selected text data set 3700. The text data set 3700 may have been previously generated as a transcript from speech audio, and/or the text data set 3700 may have been generated from any of a variety of other sources.

Following the selection of node devices 2300, in executing a coordination component 2519 of the control routine 2510, processor(s) 2550 of the control device 2500 may be caused to cooperate with processors 2350 of the node devices 2300 to coordinate communications through the network 2999 to cause the provision of a different portion 3710 of the text data set 3700 to each of the selected node devices 2300. In this way the selected node devices 2300 are prepared for use in generating n-grams from the selected text data set 3700 in a distributed manner.

Turning to FIG. 4B, in some embodiments, the processor(s) 2350 of one or more of the selected node devices 2300 may be capable of supporting multiple execution threads 2352 by which multiple different executable routines and/or multiple instances of an executable routine may be executed at least partially in parallel. Within each of such selected node devices 2300, the received text data portion 3710 may be divided into multiple text data sub-portions 3711 that are distributed among multiple execution threads 2352 therein. Within each such execution thread 2352, execution of an n-gram component 2317 of an instance of the control routine 2310 may cause a core of a processor 2350 to parse through the text within the corresponding text data sub-portion 3711 to generate n-grams therefrom.

In so doing, within each execution thread 2352, it may be that an n-gram buffer 2237 is instantiated to temporarily assemble and store sets of the generated n-grams until the n-gram buffer 2237 has been filled to at least a predetermined degree, whereupon the contents of the n-gram buffer 2237 may be added to a corresponding corpus data sub-portion 3411. In some embodiments, the n-gram buffer 2237 may be implemented as a hash map in which a two-dimensional (2D) array is defined wherein each row thereof is to store an n-gram generated from the corresponding text-data sub-portion 3711, along with a count of instances of that n-gram that have been generated. As each n-gram is generated from the text of the text data sub-portion 3711, a hash value may be taken of that n-gram, and that hash value may become the index value used to specify which row within the n-gram buffer 2237 is the row in which that n-gram is to be stored, and in which the count for that n-gram is to be incremented to reflect the generation of an instance thereof. Each time the contents of the n-gram buffer 2237 are added to the corresponding corpus data sub-portion 3411, the counts for all of the rows therein may be reset to indicate a quantity of 0 instances.

Such use of an n-gram buffer 2237 implemented as such a hash map may aid in reducing data storage requirements for each execution thread 2352 and/or for each corpus data sub-portion by enabling some degree of deduplication of n-grams to be performed. More specifically, such use of hash values as index values for rows within such an implementation of a hash table enables multiple instances of the same n-gram to be relatively quickly and efficiently identified so that just a single row of storage space within the n-gram buffer 2237 is occupied for those multiple instances, instead of allowing each of those instances to occupy a separate storage location within a data structure, even temporarily.

Such use of distributed processing across multiple node devices 2300 and/or across multiple execution threads 2352 within each node device 2300, and such use of hash maps in performing at least an initial deduplication of n-grams, may serve to enable relatively large n-gram corpuses to be generated and used in the performance of speech-to-text processing. As a result, supporting a larger than commonplace n-gram corpus that includes larger n-grams that include relatively large quantities of words (e.g., greater than the more commonplace quantities of 5 words or less) becomes practical. Alternatively or additionally, supporting a larger than commonplace n-gram corpus that includes highly infrequently used n-grams (e.g., n-grams that include names of specific people and/or places such that they may be found in just one of thousands of text documents) also becomes practical. As those skilled in the art will readily recognize, it is commonplace practice to allow only n-grams that occur in texts with a frequency above a predetermined minimum threshold frequency to be included in an n-gram corpus in an effort to limit the overall size thereof. The ability to support a larger n-gram corpus may render such a restriction unnecessary, thereby increasing the accuracy that is able to be achieved in performing to speech-to-text processing.

Within each of the selected node devices 2300, following the use of the entirety of the text data sub-portion 3711 in generating n-grams, the multiple execution threads 2352 may be caused to cooperate to assemble the multiple corpus data sub-portions 3411 therein to form a single corresponding corpus data portion 3410.

Turning to FIG. 4C, within the control device 2500, further execution of the coordination component 2519 may cause processor(s) 2550 of the control device 2500 to cooperate with processors 2350 of the node devices 2300 to coordinate communications through the network 2999 to cause the corpus data portions 3410 generated within each of the selected node devices to be provided to the one or more storage devices 2100. In so doing, the multiple corpus data portions 3410 may be combined to form a new corpus data set 3400, or may be combined and added to an existing corpus data set 3400.

Turning to FIG. 4D, as depicted, each of the corpus data sets 3400 stored within the one or more storage devices 2100 may employ a 2D array data structure of rows 3421 and columns 3422. As also depicted, while each n-gram may occupy a single row 3421, each word within an n-gram occupies a separate column 3422 such that the number of columns occupied by each n-gram is based on the quantity of words that it includes. It should be noted that FIG. 4D depicts a deliberately highly simplified example of a very small n-gram corpus that includes relatively few uni-grams 3431 and relatively few bi-grams 3432. As depicted, the single word within each of the uni-grams 3431 occupies just column 3422*a*, while the pair of words within each of the bi-grams 3432 occupies both columns 3422*a* and 3422*b*.

As will be familiar to those skilled in the art, the currently widely used standard format for organizing n-gram corpuses to implement a language model is the "ARPA" text format originally introduced by Doug B. Paul of the Massachusetts Institute of Technology. The ARPA format is generally implemented as an ASCII text file in which each n-gram is stored within a separate line of text separated by carriage returns. Although this format is widely accepted, it suffers various disadvantages, including slower access due to requiring a text parser to interpret the contents of each line (not all of which include n-grams). Another limitation of the ARPA format is the imposition of a requirement that all n-grams having the same quantity of words must be grouped together, and must be provided with a textual label indicating the quantity of words therein.

In contrast, the 2D array format depicted in FIG. 4D does not require a text parser for such purposes as it relies on the row-column organization of the array structure to enable speedier addressability and access to each word of n-gram. Also, as depicted, there may be no need to group the uni-grams 3431 together and separately from the bi-grams 3432, or to provide distinct labels or other form of identification for each group. Instead, it may simply be the quantity of columns 3422 occupied by each n-gram that determines the quantity of words therein. Again, the single word of each uni-gram 3431 occupies the single column 3422*a*, while the pair of words of each bi-gram 3432 occupies the pair of columns 3422*a* and 3422*b*, and so on. However, it should be noted that such a 2D array format enables relatively easy importation of the n-grams and related information from the ASCII text file structure of the ARPA format. Specifically, a text parser may be used just once to parse such a text file structure to identify n-grams and related information with which to fill the rows of the 2D array format.

As a result of using such a 2D array format, the combining of the corpus data portions 3410 to form a new corpus data set 3400, or to add to an existing corpus data set 3400, becomes a relatively simple matter of combining rows 3421. In this way, the need for a text parser, as well as text file editing functionality, is eliminated.

Turning to FIG. 4E, following such combining of rows 3421 as part of combining corpus data portions 3410 containing newly generated n-grams, as just discussed, processor(s) 2550 of the control device 2500 may be caused to cooperate with the one or more storage devices 2100 to re-distribute the newly formed or newly augmented corpus data set 3400 among multiple node devices 2300 in preparation for being refined. More specifically, although the newly formed or newly augmented corpus data set 3400 may contain a relatively large quantity of newly generated n-grams, there may remain duplications of n-grams therein, at least as a result of having been generated in a distributed manner across multiple node devices 2300. Also, to fully enable the use of the corpus data set 3400 as a language model, relative frequencies and/or probabilities of occurrence for each n-gram must be calculated, or re-calculated.

Unlike the relatively simple division of the text data set 3700 into text data portions 3710 earlier discussed in reference to FIG. 4A, in FIG. 4E, the rows 3421 of n-grams within the corpus data set 3400 may be reorganized into groups based on hash values taken of each n-gram. More precisely, a hash value may be taken of each n-gram, and then the n-grams may be reorganized within the corpus data set 3400 based on an ascending or descending order of their hash values. This advantageously has the result of causing the rows 3421 of duplicate n-grams to become adjacent rows 3421. With the rows 3421 of n-grams so reorganized, sub-ranges of hash values within the full range of hash values may be derived as a mechanism for dividing the corpus data set 3400 into multiple corpus data groups 3415 that contain relatively similar quantities of rows 3421 for distribution among the multiple node devices 2300. In this way, each set of adjacent rows 3421 of duplicate n-gram is kept together and provided together to a single node device 2300 for deduplication.

As previously discussed, in some embodiments, it may be that processor(s) of the one or more storage devices 2100 are capable of performing at least a limited range of processing operations needed to maintain local and/or distributed file systems as part of storing data sets of widely varying sizes within either a single storage device 2100 or across multiple storage devices 2100. In such embodiments, the processor(s) of the one or more storage devices 2100 may be capable of performing at least a limited range of data reorganization functions, including the grouping of rows within array-type data structures based on a variety of organizing criteria, including hash values. Thus, in such embodiments, it may be that processor(s) 2550 of the control device are caused, by execution of the coordinating component 2519, to transmit a command to the one or more storage devices 2100 to cause such a reorganization of the rows 3421 within the corpus data set 3400, prior to the division of the corpus data set 3400 into the multiple corpus data groups 3415 by sub-ranges of those very same hash values.

Turning to FIG. 4F, within each of the multiple node devices 2300, execution of a compacting component 2318 may cause processor(s) 2350 thereof to iterate through the rows 3421 of n-grams within its corresponding corpus data group 3415 to identify instances of two or more rows 3421 containing duplicate n-grams. For each such instance of duplicate n-grams, the two or more rows 3421 containing duplicates of an n-gram may be reduced to a single row 3421 containing just a single copy of that n-gram, and an indication of at least the quantity of duplicates identified may be stored within the single row 3421.

As such deduplication of n-grams within each corpus data group 3415 is completed, the corpus data groups 3415 may be provided to the control device 2500, where they may be re-combined to recreate the corpus data set 3400. In so doing, execution of a probability component 2511 of the control routine 2510 may cause processor(s) 2550 of the control device 2500 to calculate values for the frequency and/or probability of occurrence for each n-gram, and to augment each row 3421 with those value(s). More specifically, and as depicted in FIG. 4G, one or more columns 3422 that were previously unoccupied across all of the rows 3421 may be caused to store such frequency and/or probability values.

Returning to FIG. 4F, as will be familiar to those skilled the art, there may arise situations in which the n-grams within the corpus data set 3400 do not cover all possible combinations of the words that are present within the corpus data set 3400. This may result in a default assignment of a zero probability value to such combinations of words as if such combinations could never occur, and this may adversely affect the accuracy of the resulting language mode in speech-to-text operations.

To at least mitigate this adverse affect, the processor(s) 2550 of the control device 2500 may be caused to provide one of a variety of types of "smoothing" of values indicative of probability of occurrence for at least a subset of the n-grams within the corpus data set 3400. More specifically, for at least some n-grams with a higher probability of occurring, their probability values may be reduced by a relatively small degree (thereby indicating a slightly reduced probability of occurring), and the probability value assigned for the occurrence of n-grams not included within the corpus data set 3400 may be increased to a non-zero value.

Among the widely accepted techniques for smoothing are various "backoff" calculations that may be used to derive a backoff value by which the probability values of at least a subset of the n-grams may be multiplied to reduce those values by a relatively small degree. As those skilled in the art will readily recognize, one widely used technique for calculating the backoff value is the Katz back-off model introduced by Slava M. Katz, but this technique becomes less effective as the size of the n-gram corpus increases. Another widely known technique is the "Stupid Backoff" introduced by Google, Inc. in 2007, but this technique is based on the use of a fixed value which, despite being capable of at least somewhat better results than the Katz back-off model, can also yield increasingly less effective results as the size of the n-gram corpus increases.

To better handle the potentially larger than commonplace size of the n-gram corpus within the corpus data set 3400, the probability component 2511 may employ an entirely new calculation:

$$\text{Backoff }(n) = \frac{|\text{Set }(n\text{ gram})|}{|\text{Set }(n-1\text{ gram})|}$$

In this new calculation, the backoff value for an n-gram corpus of up to n words per n-gram may be derived by dividing the quantity of n-grams that include n words by the quantity of n-grams that include n−1 words. This backoff value is able to be quickly and simply calculated once, and then the values for the probability of occurrence of all of the n-grams may be multiplied by this backoff value. Since this backoff value is calculated based on the n-grams actually present within the corpus data set 3400, instead of being based on an arbitrary fixed value, the resulting n-gram perplexity is not rendered artificially smaller than it should be, thereby enabling better accuracy in the use of the corpus data set 3400 as a language model for speech-to-text processing operations.

In various embodiments, each of the processors 2350, 2550 and 2750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor(s) 2350 of each of the one or more node devices 2300 may be selected to efficiently perform the analysis of multiple instances of pre-processing, processing and/or post-processing operations at least partially in parallel. By way of example, the processors 2350 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 2310, 2340, 2370, 2510, 2540, 2570 and 2740, including the components of which each is composed, may be selected to be operative on whatever type of processor or processors that are selected to implement applicable ones of the processors 2350, 2550 and/or 2750 within each one of the devices 2300, 2500 and/or 2700, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2350, 2550 and/or 2750. Where one or more device drivers are included, those device drivers may provide support for any of a variety of other components, whether hardware or software components, of the devices 2300, 2500 and/or 2700.

In various embodiments, each of the storages 2360, 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2560 in embodiments in which the one or more of the federated devices 2500 provide federated spaces 2566, or the storage devices 2600 in embodiments in which the one or more storage devices 2600 provide federated spaces 2566, may be implemented with a redundant array of independent discs (RAID) of a RAID level selected to provide fault tolerance to objects stored within the federated spaces 2566.

In various embodiments, the input device 2720 may be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, the display 2780 may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2780 may be a touchscreen display such that the input device 2720 may be incorporated therein as touch-sensitive components thereof.

In various embodiments, each of the network interfaces 2390, 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

However, in a specific embodiment, one or more of the network interfaces 2390 and/or 2590 may be implemented with multiple copper-based or fiber-optic based network interface ports to provide redundant and/or parallel pathways in exchanging at least the speech data sets 2130.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the speech data sets 2130 are not dependent on, nor constrained by, existing API architectures and/or supporting communications protocols. More broadly, there is nothing in the manner in which the speech data sets 2130 may be organized in storage, transmission and/or distribution via the network 2999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising at least one processor and a storage to store instructions that, when executed by the at least one processor, cause the at least one processor to perform operations comprising:
    receive, from a requesting device via a network, a request to perform operations comprising speech-to-text conversion of a specified speech data set representing speech audio; and
    in response to the request, the at least one processor is caused to perform speech-to-text processing operations comprising:
        select, based on a level of availability of at least one resource of each node device of a plurality of node devices, a first subset of the plurality of node devices to perform searches for n-grams within an n-gram corpus provided to each node device of the first subset;
        generate a set of candidate n-grams based on probability distributions generated by an acoustic model for candidate graphemes of a next word most likely spoken following at least one preceding word spoken within the speech audio;
        provide the set of candidate n-grams to each node device of the first subset;
        provide, to each node device of the first subset, an indication of which candidate n-grams are to be searched for within the n-gram corpus by a processor of the node device to enable searches for multiple candidate n-grams to be performed, independently and at least partially in parallel, across the first subset;
        receive, from each node device of the first subset, an indication of a probability of occurrence of at least one candidate n-gram within the speech audio;
        based on the received probabilities of occurrence for each candidate n-gram of the set of candidate n-grams, identify the next word most likely spoken within the speech audio; and
        add the next word most likely spoken to a transcript of the speech audio.

2. The apparatus of claim 1, wherein, in response to the request, the at least one processor is caused to perform pre-processing operations comprising:
    provide the speech data set to each node device of a second subset of the plurality of node devices to enable each node device of the second subset to perform a different segmentation technique of multiple segmentation techniques to independently identify likely sentence pauses within the speech audio, at least partially in parallel;
    receive, from each node device of the second subset, a candidate set of likely sentence pauses of multiple candidate sets of likely sentence pauses; and
    combine the multiple candidate sets of likely sentence pauses to derive a converged set of likely sentence pauses to serve as a basis for dividing the speech data set into multiple data segments to cause division of the speech audio into corresponding multiple speech segments.

3. The apparatus of claim 1, wherein, in response to the request, the at least one processor is caused to perform operations comprising:
    select, based on a level of availability of the at least one resource of each node device of the plurality of node devices, a third subset of the plurality of node devices to generate the probability distributions for the candidate graphemes of multiple words spoken within the speech audio, including the next word most likely spoken;
    provide, to each node device of the third subset, a different data segment of the multiple data segments to enable the generation of probability distributions for candidate graphemes for each word of the multiple words by multiple implementations of the acoustic model among the node devices of the third subset, at least partially in parallel across the third subset; and
    receive, from the third subset, the probability distributions for the candidate graphemes for each word of the multiple words, including the candidate graphemes of the next word most likely spoken.

4. The apparatus of claim 1, wherein, to select the first subset of the plurality of node devices, the at least one processor is caused to:
    receive indications of levels of availability of the at least one resource from each node device of the plurality of node devices, wherein the at least one resource comprises at least one of:
        a processor core;
        storage space; or
        a neural network;
    compare the levels of availability of the at least one resource to at least one threshold minimum level of availability; and
    select the first subset based on the comparison.

5. The apparatus of claim 1, wherein:
    the corpus data set comprises an array data structure;
    each n-gram of the n-gram corpus is stored within a separate row of the array data structure;
    within each row in which an n-gram is stored, each word of the n-gram is stored within a separate column of the array data structure; and
    the at least one processor is caused to perform operations comprising:

divide a text data set comprising text of at least one document into multiple text data portions;

provide, to each node device of a fourth subset of the plurality of node devices, a different text data portion of the multiple text data portions to enable a separate corpus data portion comprising n-grams of a corresponding one of the text data portions to be generated by each node device of the fourth subset, at least partially in parallel;

receive one of the separate corpus data portions from each node device of the fourth subset, wherein each corpus data portion comprises a subset of the rows of the array data structure; and combine the rows of the received corpus data portions to assemble the corpus data set.

6. The apparatus of claim 5, wherein the at least one processor is caused to perform operations comprising:

generate a separate hash value from each n-gram stored within a row of the corpus data set;

reorganize the rows of the corpus data set to reorganize the n-grams within the corpus data set based on an ascending or descending order of the corresponding hash values generated from the n-grams;

divide a range of the hash values into multiple sub-ranges;

provide, to each node device of a fifth subset of the plurality of node devices, a different subset of the rows of the corpus data set that correspond to hash values that fall within a different one of the sub-ranges of hash values to enable each node device of the fifth subset to deduplicate n-grams by removing rows that store duplicates of n-grams from one of the subsets of rows, at least partially in parallel across the fifth subset;

receive, from each node device of the fifth subset, one of the subsets of rows following the removal of rows that store duplicates of n-grams therefrom;

combine the received subsets of rows to reassemble the corpus data set in deduplicated form;

determine a largest quantity of words, n, within any n-gram within the corpus data set;

divide a quantity of the n-grams within the corpus data set that include n words by a quantity of the n-grams within the corpus data set that include n−1 words to derive a backoff value;

calculate a probability value indicative of a probability of occurrence for each n-gram within the corpus data set, wherein each probability value is multiplied by the backoff value; and for each n-gram of the corpus data set, store the corresponding probability within the corresponding row.

7. The apparatus of claim 1, wherein, to generate the set of candidate n-grams based on the probability distributions for candidate graphemes of the next word most likely spoken, the at least one processor is caused to:

generate a set of candidate words based on the probability distributions for candidate graphemes of the next word most likely spoken; and combine each candidate word with one or more preceding words previously identified as having been spoken in the speech audio to form the set of candidate n-grams.

8. The apparatus of claim 1, wherein, to provide each node device of the first subset an indication of which candidate n-gram is to be searched for within the n-gram corpus by a processor of the node device, the at least one processor is caused to:

determine a quantity of node devices in the first subset;

generate a set of node identifiers that each comprise a different numerical value of a series of numerical values; and provide each node device of the first subset with a different node identifier of the set of node identifiers to enable use of modulo calculation within each node device of the first subset to independently determine which one or more candidate n-grams of the set of candidate n-grams is to be searched for within each node device of the first subset.

9. The apparatus of claim 8, wherein, across the node devices of the first subset, beam searches are performed at least partially in parallel to search for candidate n-grams of the set of candidate n-grams within the n-gram corpus.

10. The apparatus of claim 1, wherein, in response to the request, the at least one processor is caused to perform post-processing text analysis operations, wherein:

the post-processing text analysis operations comprise at least one of:

generate a count of occurrences of at least one term within the transcript;

generate an aggregate count of occurrence of multiple related terms of the at least one term within the transcript;

derive a degree of relevance of the at least one term to a topic of the transcript;

identify a semantic relationship among multiple terms of the at least one term;

identify a grammatical relationship among multiple terms of the at least one term;

identify a relationship among at least two objects that are each named by a different term of the at least one term;

identify a category of an object named by the at least one term;

determine whether a sentiment associated with the at least one term is positive or negative; or determine a degree of strength of the sentiment;

each term of the at least one term comprises at least one word; and a visualization is generated based on a result of the post-processing text analysis operations.

11. A computer-program product tangibly embodied in a non-transitory machine-readable storage medium, the computer-program product including instructions operable to cause at least one processor to perform operations comprising:

receive, from a requesting device via a network, a request to perform operations comprising speech-to-text conversion of a specified speech data set representing speech audio; and in response to the request, the at least one processor is caused to perform speech-to-text processing operations comprising:

select, based on a level of availability of at least one resource of each node device of a plurality of node devices, a first subset of the plurality of node devices to perform searches for n-grams within an n-gram corpus provided to each node device of the first subset;

generate a set of candidate n-grams based on probability distributions generated by an acoustic model for candidate graphemes of a next word most likely spoken following at least one preceding word spoken within the speech audio;

provide the set of candidate n-grams to each node device of the first subset;

provide, to each node device of the first subset, an indication of which candidate n-grams are to be searched for within the n-gram corpus by a processor of the node device to enable searches for multiple candidate n-grams to be performed, independently and at least partially in parallel, across the first subset;

receive, from each node device of the first subset, an indication of a probability of occurrence of at least one candidate n-gram within the speech audio;

based on the received probabilities of occurrence for each candidate n-gram of the set of candidate n-grams, identify the next word most likely spoken within the speech audio; and add the next word most likely spoken to a transcript of the speech audio.

12. The computer-program product of claim 11, wherein, in response to the request, the at least one processor is caused to perform pre-processing operations comprising:

provide the speech data set to each node device of a second subset of the plurality of node devices to enable each node device of the second subset to perform a different segmentation technique of multiple segmentation techniques to independently identify likely sentence pauses within the speech audio, at least partially in parallel;

receive, from each node device of the second subset, a candidate set of likely sentence pauses of multiple candidate sets of likely sentence pauses; and combine the multiple candidate sets of likely sentence pauses to derive a converged set of likely sentence pauses to serve as a basis for dividing the speech data set into multiple data segments to cause division of the speech audio into corresponding multiple speech segments.

13. The computer-program product of claim 11, wherein, in response to the request, the at least one processor is caused to perform operations comprising:

select, based on a level of availability of the at least one resource of each node device of the plurality of node devices, a third subset of the plurality of node devices to generate the probability distributions for the candidate graphemes of multiple words spoken within the speech audio, including the next word most likely spoken;

provide, to each node device of the third subset, a different data segment of the multiple data segments to enable the generation of probability distributions for candidate graphemes for each word of the multiple words by multiple implementations of the acoustic model among the node devices of the third subset, at least partially in parallel across the third subset; and receive, from the third subset, the probability distributions for the candidate graphemes for each word of the multiple words, including the candidate graphemes of the next word most likely spoken.

14. The computer-program product of claim 11, wherein, to select the first subset of the plurality of node devices, the at least one processor is caused to:

receive indications of levels of availability of the at least one resource from each node device of the plurality of node devices, wherein the at least one resource comprises at least one of:
a processor core;
storage space; or
a neural network;

compare the levels of availability of the at least one resource to at least one threshold minimum level of availability; and select the first subset based on the comparison.

15. The computer-program product of claim 11, wherein:
the corpus data set comprises an array data structure;
each n-gram of the n-gram corpus is stored within a separate row of the array data structure;
within each row in which an n-gram is stored, each word of the n-gram is stored within a separate column of the array data structure; and
the at least one processor is caused to perform operations comprising:
divide a text data set comprising text of at least one document into multiple text data portions;
provide, to each node device of a fourth subset of the plurality of node devices, a different text data portion of the multiple text data portions to enable a separate corpus data portion comprising n-grams of a corresponding one of the text data portions to be generated by each node device of the fourth subset, at least partially in parallel;
receive one of the separate corpus data portions from each node device of the fourth subset, wherein each corpus data portion comprises a subset of the rows of the array data structure; and
combine the rows of the received corpus data portions to assemble the corpus data set.

16. The computer-program product of claim 15, wherein the at least one processor is caused to perform operations comprising:

generate a separate hash value from each n-gram stored within a row of the corpus data set;

reorganize the rows of the corpus data set to reorganize the n-grams within the corpus data set based on an ascending or descending order of the corresponding hash values generated from the n-grams;

divide a range of the hash values into multiple sub-ranges;

provide, to each node device of a fifth subset of the plurality of node devices, a different subset of the rows of the corpus data set that correspond to hash values that fall within a different one of the sub-ranges of hash values to enable each node device of the fifth subset to deduplicate n-grams by removing rows that store duplicates of n-grams from one of the subsets of rows, at least partially in parallel across the fifth subset;

receive, from each node device of the fifth subset, one of the subsets of rows following the removal of rows that store duplicates of n-grams therefrom;

combine the received subsets of rows to reassemble the corpus data set in deduplicated form;

determine a largest quantity of words, n, within any n-gram within the corpus data set;

divide a quantity of the n-grams within the corpus data set that include n words by a quantity of the n-grams within the corpus data set that include n−1 words to derive a backoff value;

calculate a probability value indicative of a probability of occurrence for each n-gram within the corpus data set, wherein each probability value is multiplied by the backoff value; and for each n-gram of the corpus data set, store the corresponding probability within the corresponding row.

17. The computer-program product of claim 11, wherein, to generate the set of candidate n-grams based on the probability distributions for candidate graphemes of the next word most likely spoken, the at least one processor is caused to:
generate a set of candidate words based on the probability distributions for candidate graphemes of the next word most likely spoken; and
combine each candidate word with one or more preceding words previously identified as having been spoken in the speech audio to form the set of candidate n-grams.

18. The computer-program product of claim 11, wherein, to provide each node device of the first subset an indication of which candidate n-gram is to be searched for within the n-gram corpus by a processor of the node device, the at least one processor is caused to:
determine a quantity of node devices in the first subset;
generate a set of node identifiers that each comprise a different numerical value of a series of numerical values; and
provide each node device of the first subset with a different node identifier of the set of node identifiers to enable use of modulo calculation within each node device of the first subset to independently determine which one or more candidate n-grams of the set of candidate n-grams is to be searched for within each node device of the first subset.

19. The computer-program product of claim 18, wherein, across the node devices of the first subset, beam searches are performed at least partially in parallel to search for candidate n-grams of the set of candidate n-grams within the n-gram corpus.

20. The computer-program product of claim 11, wherein, in response to the request, the at least one processor is caused to perform post-processing text analysis operations, wherein:
the post-processing text analysis operations comprise at least one of:
generate a count of occurrences of at least one term within the transcript;
generate an aggregate count of occurrence of multiple related terms of the at least one term within the transcript;
derive a degree of relevance of the at least one term to a topic of the transcript;
identify a semantic relationship among multiple terms of the at least one term;
identify a grammatical relationship among multiple terms of the at least one term;
identify a relationship among at least two objects that are each named by a different term of the at least one term;
identify a category of an object named by the at least one term;
determine whether a sentiment associated with the at least one term is positive or negative; or
determine a degree of strength of the sentiment;
each term of the at least one term comprises at least one word; and
a visualization is generated based on a result of the post-processing text analysis operations.

21. A computer-implemented method comprising:
receiving, at a control device of a distributed processing system, and from a requesting device via a network, a request to perform operations comprising speech-to-text conversion of a specified speech data set representing speech audio; and
in response to the request, performing speech-to-text processing operations comprising:
selecting, by at least one processor of the distributed processing system, and based on a level of availability of at least one resource of each node device of a plurality of node devices, a first subset of the plurality of node devices to perform searches for n-grams within an n-gram corpus provided to each node device of the first subset;
generating, by the at least one processor, a set of candidate n-grams based on probability distributions generated by an acoustic model for candidate graphemes of a next word most likely spoken following at least one preceding word spoken within the speech audio;
providing the set of candidate n-grams to each node device of the first subset;
providing, to each node device of the first subset, an indication of which candidate n-grams are to be searched for within the n-gram corpus by a processor of the node device to enable searches for multiple candidate n-grams to be performed, independently and at least partially in parallel, across the first subset;
receiving, at the control device, and from each node device of the first subset, an indication of a probability of occurrence of at least one candidate n-gram within the speech audio;
based on the received probabilities of occurrence for each candidate n-gram of the set of candidate n-grams, identifying, by the at least on processor, the next word most likely spoken within the speech audio; and
adding the next word most likely spoken to a transcript of the speech audio.

22. The computer-implemented method of claim 21, comprising, in response to the request, performing pre-processing operations comprising:
providing the speech data set to each node device of a second subset of the plurality of node devices to enable each node device of the second subset to perform a different segmentation technique of multiple segmentation techniques to independently identify likely sentence pauses within the speech audio, at least partially in parallel;
receiving, at the control device, and from each node device of the second subset, a candidate set of likely sentence pauses of multiple candidate sets of likely sentence pauses; and
combining the multiple candidate sets of likely sentence pauses to derive a converged set of likely sentence pauses to serve as a basis for dividing the speech data set into multiple data segments to cause division of the speech audio into corresponding multiple speech segments.

23. The computer-implemented method of claim 21, comprising, in response to the request, performing operations comprising:
selecting, based on a level of availability of the at least one resource of each node device of the plurality of node devices, a third subset of the plurality of node devices to generate the probability distributions for the candidate graphemes of multiple words spoken within the speech audio, including the next word most likely spoken;
providing, to each node device of the third subset, a different data segment of the multiple data segments to enable the generation of probability distributions for candidate graphemes for each word of the multiple words by multiple implementations of the acoustic model among the node devices of the third subset, at least partially in parallel across the third subset; and receiving, at the control device, and from the third subset, the probability distributions for the candidate graphemes for each word of the multiple words, including the candidate graphemes of the next word most likely spoken.

24. The computer-implemented method of claim 21, wherein, selecting the first subset of the plurality of node devices comprises performing operations comprising:

receiving indications of levels of availability of the at least one resource from each node device of the plurality of node devices, wherein the at least one resource comprises at least one of:
  a processor core;
  storage space; or
  a neural network;
comparing the levels of availability of the at least one resource to at least one threshold minimum level of availability; and
selecting the first subset based on the comparison.

25. The computer-implemented method of claim 21, wherein:

the corpus data set comprises an array data structure;
each n-gram of the n-gram corpus is stored within a separate row of the array data structure;
within each row in which an n-gram is stored, each word of the n-gram is stored within a separate column of the array data structure; and
the method comprises performing operations comprising:
  dividing a text data set comprising text of at least one document into multiple text data portions;
  providing, to each node device of a fourth subset of the plurality of node devices, a different text data portion of the multiple text data portions to enable a separate corpus data portion comprising n-grams of a corresponding one of the text data portions to be generated by each node device of the fourth subset, at least partially in parallel;
  receiving one of the separate corpus data portions from each node device of the fourth subset, wherein each corpus data portion comprises a subset of the rows of the array data structure; and
  combining the rows of the received corpus data portions to assemble the corpus data set.

26. The computer-implemented method of claim 25, comprising:

generating a separate hash value from each n-gram stored within a row of the corpus data set;
reorganizing the rows of the corpus data set to reorganize the n-grams within the corpus data set based on an ascending or descending order of the corresponding hash values generated from the n-grams;
dividing a range of the hash values into multiple sub-ranges;
providing, to each node device of a fifth subset of the plurality of node devices, a different subset of the rows of the corpus data set that correspond to hash values that fall within a different one of the sub-ranges of hash values to enable each node device of the fifth subset to deduplicate n-grams by removing rows that store duplicates of n-grams from one of the subsets of rows, at least partially in parallel across the fifth subset;
receiving, from each node device of the fifth subset, one of the subsets of rows following the removal of rows that store duplicates of n-grams therefrom;
combining the received subsets of rows to reassemble the corpus data set in deduplicated form;
determining a largest quantity of words, n, within any n-gram within the corpus data set;
dividing a quantity of the n-grams within the corpus data set that include n words by a quantity of the n-grams within the corpus data set that include n−1 words to derive a backoff value;
calculating a probability value indicative of a probability of occurrence for each n-gram within the corpus data set, wherein each probability value is multiplied by the backoff value; and
for each n-gram of the corpus data set, storing the corresponding probability within the corresponding row.

27. The computer-implemented method of claim 21, wherein, generating the set of candidate n-grams based on the probability distributions for candidate graphemes of the next word most likely spoken comprising performing operations comprising:

generating a set of candidate words based on the probability distributions for candidate graphemes of the next word most likely spoken; and
combining each candidate word with one or more preceding words previously identified as having been spoken in the speech audio to form the set of candidate n-grams.

28. The computer-implemented method of claim 21, wherein, providing each node device of the first subset an indication of which candidate n-gram is to be searched for within the n-gram corpus by a processor of the node device comprises performing operations comprising:

determining a quantity of node devices in the first subset;
generating a set of node identifiers that each comprise a different numerical value of a series of numerical values; and
providing each node device of the first subset with a different node identifier of the set of node identifiers to enable use of modulo calculation within each node device of the first subset to independently determine which one or more candidate n-grams of the set of candidate n-grams is to be searched for within each node device of the first subset.

29. The computer-implemented method of claim 28, wherein, across the node devices of the first subset, beam searches are performed at least partially in parallel to search for candidate n-grams of the set of candidate n-grams within the n-gram corpus.

30. The computer-implemented method of claim 21, comprising, in response to the request, performing post-processing text analysis operations, wherein:

the post-processing text analysis operations comprise at least one of:
  generating a count of occurrences of at least one term within the transcript;
  generating an aggregate count of occurrence of multiple related terms of the at least one term within the transcript;
  deriving a degree of relevance of the at least one term to a topic of the transcript;
  identifying a semantic relationship among multiple terms of the at least one term;
  identifying a grammatical relationship among multiple terms of the at least one term;
  identifying a relationship among at least two objects that are each named by a different term of the at least one term;

identifying a category of an object named by the at least one term;

determining whether a sentiment associated with the at least one term is positive or negative; or determining a degree of strength of the sentiment;

each term of the at least one term comprises at least one word; and a visualization is generated based on a result of the post-processing text analysis operations.

* * * * *